US008666299B2

(12) United States Patent
Botha et al.

(10) Patent No.: US 8,666,299 B2
(45) Date of Patent: Mar. 4, 2014

(54) EARLY ALERT SYSTEM AND METHOD FOR IDENTIFYING AND ASSISTING STUDENTS IN NEED AT AN EDUCATIONAL INSTITUTION

(75) Inventors: Gideon Petrus Botha, Abilene, TX (US); Robert Jeffrey Reese, Lexington, KY (US); Charles William Mattis, Abilene, TX (US); Charles Dwayne Miller, Abilene, TX (US); Megan E Lyman, legal representative, Raleigh, NC (US)

(73) Assignee: Pharos Resources, LLC, Horseshoe Bay, TX (US)

( * ) Notice: Subject to any disclaimer, the term of this patent is extended or adjusted under 35 U.S.C. 154(b) by 1369 days.

(21) Appl. No.: 12/173,904

(22) Filed: Jul. 16, 2008

(65) Prior Publication Data
US 2009/0029339 A1 Jan. 29, 2009

Related U.S. Application Data

(60) Provisional application No. 60/951,490, filed on Jul. 24, 2007.

(51) Int. Cl.
G09B 7/00 (2006.01)
(52) U.S. Cl.
USPC .......................................... 434/350; 434/433
(58) Field of Classification Search
USPC ................................................. 434/350, 433
See application file for complete search history.

(56) References Cited

U.S. PATENT DOCUMENTS

| 6,270,351 B1 * | 8/2001 | Roper ........................... 434/118 |
| 6,754,674 B2 | 6/2004 | Meyers et al. |
| 2005/0282125 A1 | 12/2005 | Christensen et al. |
| 2006/0036460 A1 | 2/2006 | Gibbons et al. |

FOREIGN PATENT DOCUMENTS

CN          101299262      *  4/2007   ............. G06Q 50/00

OTHER PUBLICATIONS

Randi Levitz & Lee Noel, Taking Initiative: Strategic Moves for Retention, 2000, pp. 1-5, www.noellevitz.com.
Lana Low, Successful Retention Planning: A Step-by-Step Approach, Fourth Annual National Enrollment Managment Institute, Marriot's Mountain Resort, Vail, CO, Jun. 28, 1999, pp. 1-24, www.noellevitz.com.
Randi Levitz & Lee Noel, Tired of Moving Mountains? Getting Retention Results Really is Easy, 2000, pp. 1-3, www.noellevitz.com.

* cited by examiner

Primary Examiner — Kang Hu
(74) Attorney, Agent, or Firm — Megan E. Lyman

(57) ABSTRACT

The present invention is a system and method that proactively identifies a student in need at an educational institution. The system allows for the educational institution to connect with the student, gather information, and provide assistance. Student needs that may be addressed are various and include academic, social, emotional, and spiritual. Because student needs are addressed in a timely and effective manner, the present invention may be used as a tool to increase retention rates at the educational institution.

18 Claims, 23 Drawing Sheets

Figure 3a

Student's name: [Auto-Fill]
Student's user id (should look like: xxx02x): [Auto-Fill]
Student's banner id:
Your department/office: [Auto-Fill]
Your telephone number:
Would you like to be included in the circle of care and be notified of the student's progress:
○ Yes, that would be great.
○ No, it is not necessary.
Category of referral:

Student Contact Info (If known to be different from Banner.)
Telephone:
Cellphone:
Alternate Email Address:
Comments on Contact Info:

Reasons for Referral

Academic Issues
☐ Grades
☐ Attendance
☐ Homework
☐ Other (Please explain below.)
Physical/Mental Health Issues
☐ Illness
☐ Needs Encouragement
☐ Personal Issues
☐ Other (Please explain below.)

Major/Career Issues
☐ Undecided Major
☐ Unsuitable Major
☐ Other (Please explain below.)
Other Issues
☐ Crisis at Home
☐ Financial
☐ Chapel
☐ Other (Please explain below.)

Any Other Information That May Help

EARLY ALERT SYSTEM AND METHOD FOR IDENTIFYING AND ASSISTING STUDENTS IN NEED AT AN EDUCATIONAL INSTITUTION

This is a nonprovisional application claiming priority to provisional application Ser. No. 60/951,490 filed Jul. 24, 2007.

BACKGROUND

The present invention relates generally to the field of increasing retention rates in an educational institution while significantly improving the educational experience of its students. More particularly, the present invention provides means for proactively identifying students in need, whether the need is emotional, physical, spiritual, or scholastic, and providing an avenue to assist those students.

Retention rate has been defined by the federal government and is required to be reported on an annual basis by educational institutions. As defined, "program retention" tracks the full-time student in a degree program over time to determine whether the student has completed the program. Retention rate is an important statistic for educational institutions, from both a financial and emotional perspective. Retention rates are viewed by prospective students and their parents and a low retention rate will likely lead to the educational institution as being viewed as less desirable, and may even affect the institution's ranking, leading to a decrease in the applicant pool. Moreover, when a student discontinues his or her studies, the educational institution suffers a large financial loss in terms of future tuition payments as well as potential financial contributions as an alumnus. Other reasons educational institutions are so interested in improving retention rates include the prevention of loss for the student as a member of society in development of critical thinking skills, preparation of the student for the working environment, and increasing the student's tolerance of individual differences. It is also important to note, that as a student progresses in his or her studies, the community within the educational institution becomes invested in each student, hoping to nurture the student not only academically, but personally as they accomplish their educational goals. When a student discontinues his or her studies, this investment is lost.

Once a student is in struggle, unless identified and resolved, the student may suffer poor performance in his or her studies or a lack of interest in progressing at the institution. If unresolved, the student may terminate his or her studies at that institution. Where the student's needs can be identified and assisted at the onset of such an issue, before those needs lead to a decrease in performance, the likelihood that the student will terminate his or her studies decreases significantly. This results in an increased retention rate for the educational institution and a correlative increase in desirability of the institution by prospective students. It also results in a happier student and academic community as a whole. Moreover, as distinguished from present retention systems, a system that addresses non-academic, as well as academic needs of the student is necessary to attain the highest retention rate achievable by the educational institution. See Levitz, Highlights from 4 Institutions Getting Results, Spring 1998, Strategies, pg. 157. It also results in a happier student and academic community.

The dilemma presented is that many students in the midst of struggle are unaware of the resources available to them. "Institutions need to take these initiatives, rather than expecting the student to take them, because many students are not in a position to commit themselves fully to or even understand the many and right resources of the institution and their accompanying benefits." Levitz & Noel, 1999, pg. 127.

The correlation between the ability to identify a student in need and increased retention is not novel. There have been many theories proposed on the main causes of retention of students in an educational institution. Most relevant, in 1971 the Spady Model was introduced stating that the interaction between student characteristics and campus environment play a large role in student retention. Braxton & Hirschy (2005). Theoretical Developments in the study of college student departure. In Siedman, A. (Ed.). College student retention: Formula for student success. Praeger Press. Since then, one scholar has turned retention success into a mathematical formula. Dr. Alan Seidman's formula proposes that: retention=early identification+(early+intensive+continuous) intervention. Id. Dr. Seidman's formula has been implemented in different forms at various educational institutions. The student provides information to the educational institution through a written or computerized assessment; the institution receives those assessments and determines whether the student is in need. Moreover such assistance to a student identified by such programs is generally limited to academic needs. Other programs use the financial aid office of the institution as a source of student information that may be used in determining whether the student is in a class of students that are at a higher risk of having special needs such as adults and distance learning students. A representative program in place at Old Dominion University evaluates high school GPA and SAT scores to create an index used to identify at-risk first-year students before they begin their first semester and offers them assistance before they encounter difficulty.

The University of Arizona, however, has adopted and implemented a program called "Success Net" wherein instructors of freshmen students in their first semester are able to identify students in need to the student's faculty advisor through a referral network. While such a system has been effective for the University in improving retention rates, its focus on freshmen students and faculty for the identification of students in need is narrow and its implementation is inefficient. Moreover referral to the student's faculty advisor may well foreclose resolution of issues outside of academia.

Past systems implemented by educational institutions for the purpose of increasing retention rates systems have focused primarily on either monitoring student performance by the grades received in their courses of study or in assessments taken as the student enters the educational institution. Other systems give advice to students in need via computer dialog or otherwise. Thus, it is desirable to establish a system that is efficient in identifying students in need at any time during their educational studies, communicating those needs to persons with the ability to provide assistance, and addressing the needs of that student at the earliest possible stage.

SUMMARY

An embodiment of the present invention is a system and method that improves student retention and student life by providing a proactive method of identifying students in need at any early stage and connecting them to an appropriate resource in a supportive environment. In this embodiment of the present invention a means for students/peers, parents, staff, faculty, and other persons with a relationship to the student to play an active role in the identification and resolution of a student's needs are provided. To ensure that students do not struggle alone, and are aware of the supportive network around them, the present invention provides a structured opportunity for such persons with a relationship to the student to build a partnership with the educational institution for the benefit of the student in need. By allowing participation by many different groups within the educational institution environment and otherwise, student needs that fall into a wide variety of categories may be addressed.

In this embodiment of the present invention, the student is referred to the system by faculty, staff, parents, students/peers, or any other person with a relationship to the student. The system then allows that student to be directed to an appropriate resource so that there is the opportunity for resolution of the issue. Because the present invention in one embodiment may be virtually paperless, the period of time from which a student in need is identified, to that student receiving assistance is minimal, thus providing the student with the confidence that his or her issue is important. This leads to an increased chance of resolution.

Through the personal contact afforded by the system, the student is made aware of the support network around him or her. With this awareness and through the connections to caring persons made through the system, the student's quality of life at the educational institution may be improved. An improved outlook and quality of life for the student increases that student's likelihood of continuing his or her studies at that educational institution. An improved quality of life for the student thereby has the effect of increasing retention rates at the educational institution. Such increases have been observed and recorded by one institution implementing the system. [FIGS. 18-21]

Moreover, in this embodiment of the present invention the system provides a means for faculty and staff at the educational institution to be supported in their efforts when they intervene to assist a student. Support is given in various forms such as feedback at the referral stage, and notification of a student in need's progress through the system. This has the effect of increasing the likelihood that faculty and staff will identify a student that is in need. This increased likelihood of intervention is especially important because a student, in most cases, has weekly or even daily interactions with such personnel.

Additionally, it is an aspect of the present invention in one embodiment that various metrics regarding counselor efficacy, retention of students using the present invention versus those not using the system, frequency of specific issues arising in the student body and being brought into the system, and resolution frequency may be accessed at any time by specific members of the educational institution. Such access to metrics allows the present invention to evolve to be more efficient as it is used at the educational institution. Moreover, such metrics provide the educational institution with real-time statistics of retention rate change as a direct result of the present invention.

It is therefore an aspect of the present invention to provide means for faculty, staff, parents, student/peers, and/or other persons with a relationship to a student to alert the educational institution of a student's needs.

It is another aspect of the present invention to proactively identify student needs that may be referred to an individual or group of individuals that may assess and address the student's needs.

It is still another aspect of the present invention to build a relationship between the student and individuals who are capable of addressing student needs, and where appropriate, refer the student to specialized individuals for the resolution of those needs.

It is an aspect of the present invention to allow for the utilization of software and network interfaces to allow for immediate notification of student needs, and gathering of student information.

It is still another aspect of the present invention to allow for a system utilizing software to streamline information gathering from instructors and persons who are in contact with the student and general information about the student.

It is another aspect of the present invention to address student needs in a timely manner at any point during the course of the student's educational experience at the institution.

It is still another aspect of the present invention to retain information about the student and the issue within the system for future use, should the student have new needs arise.

It is yet another aspect of the present invention to make accessible to the educational institution metrics regarding the system, including: efficacy of counselors, frequency of specific issues, frequency of resolution, and retention rate increases.

These aspects and other embodiments will be come apparent by reference to the drawings and the descriptions that follow.

DESCRIPTION OF THE DRAWINGS

FIG. 3a illustrates an exemplary referral form to be used by persons within the educational institution to identify student needs according to an embodiment of the present invention.

DESCRIPTION

Figure 1:
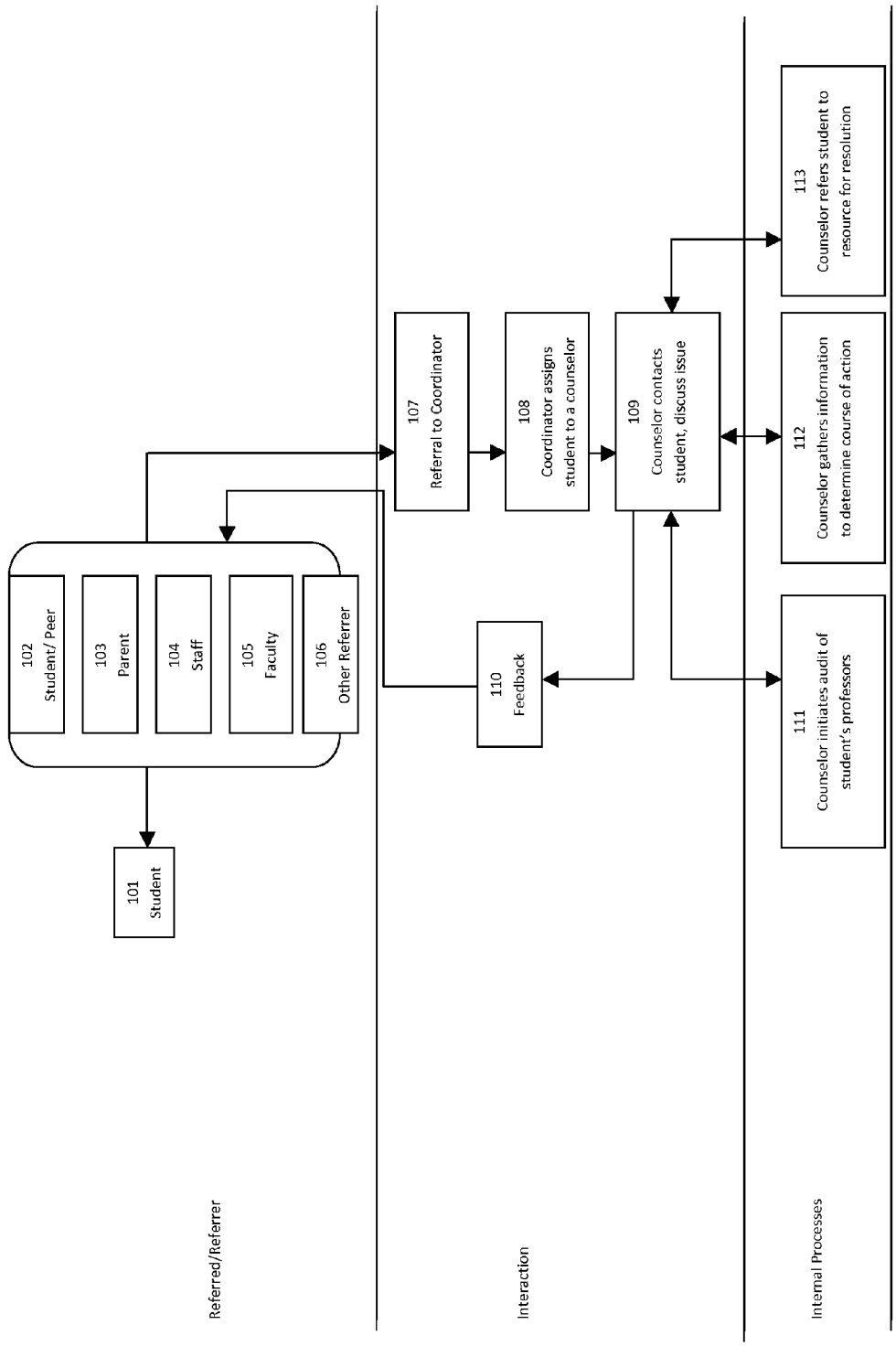
FIG. 1 illustrates a block diagram of the general scheme of proactively identifying and addressing student needs.

Objectives and various embodiments of the present invention are described in the detailed discussion that follows.

Definitions

"Audit" is a means by which a counselor asks a student's instructor for information regarding the student's class attendance, performance, or any other behavior that the instructor would deem pertinent.

"Circle of Care" refers to persons who have referred the student to the system or whom have been contacted to give information about the student and have indicated that they are interested in monitoring the student's progress.

A "counselor" is someone who is either licensed in the field of counseling or is seeking to be licensed and is supervised by a licensed professional in the field of counseling.

The "Save Our Students" system describes the general process of identifying a student in need, gathering information regarding the student and his or her need, and addressing the need.

Overview

In an embodiment of the present invention, a system and method for proactively identifying students in need, whether it is emotional, physical, spiritual, or scholastic, and providing an avenue to assist those students is provided. In this embodiment of the present invention, faculty, staff, parents, students/peers, and other persons with a relationship to the student interact with the educational institution via a network interface or by another appropriate means such as telephone, e-mail, or personal contact to identify a student in need to the educational institution. Persons making such a referral are referred to as being in the student's "Circle of Care" network. The interaction between the student, his or her Circle of Care, and the institution evolves through various stages.

In another embodiment of the present invention, a system and method for proactively identifying students in need, and providing assistance comprises the student being identified and brought into the "Save Our Students" (SOS) system. In this embodiment the student is identified by a referral sent to the SOS system coordinator. In one embodiment the referral is accepted by the coordinator into the system, a file is created for the student, and a counselor is assigned to the student.

In yet another embodiment of the present invention, a system and method for proactively identifying students in need, and providing assistance comprising a counselor initiating contact with the student for the purposes of assessing the students needs. Means for initiating contact include, but are not limited to: telephone, postcard, e-mail, voicemail, and direct in-person contact. In this embodiment if contact is accomplished, the counselor may indicate as such in the student's SOS system file. Furthermore, in this embodiment where contact is made, the counselor will set up a time to have a student interview to assess the student needs.

In still another embodiment of the present invention, a system and method for proactively identifying students in need, and providing assistance comprising the counselor initiating an audit, which seeks information about the student from the student's instructors. Means for efficiently sending a request to each instructor via e-mail is provided, although contact with an instructor may be accomplished by other similar means, including but not limited to telephone, or in-person contact.

In a further embodiment of the present invention, a system and method for proactively identifying students in need, and providing assistance comprising the counselor reviewing all information gathered on the student, assessing the student's needs with the student, and determining an appropriate course of action. In this embodiment an appropriate course of action may include but is not limited to doing nothing as the student does not need assistance, or to refer the student to another individual specialized in helping students with such needs.

In a further embodiment of the present invention, a system and method for proactively identifying students in need, and providing assistance comprising the counselor closing the student's SOS system file where the student's needs have been addressed. In this embodiment, closing the file does not serve to delete the file entirely from the software, but will store information such as the case notes for potential future referrals of that student to the SOS system at another time.

In yet another embodiment of the present invention, a system and method for proactively identifying students in need, and providing assistance comprising an authorized member of the educational institution using the software system to access various metrics of the present invention. In this embodiment such metrics include, but are not limited too: efficacy of specific counselors, frequency of specific issues being brought to the system, resolution frequency, affect of resolution on retention rates, affect of being in the system on retention rates, and the direct impact of the present invention on retention rates at the educational institution as a whole.

DETAILED DESCRIPTION

FIG. 1 illustrates the general scheme of the system. In one embodiment of the present invention, the student 101 is referred to the SOS system by a student/peer 102, parent 103, faculty 105, staff 104, or other person with a relationship to the student 106. Such a referral is received by the SOS program coordinator 107. In this embodiment, the program coordinator accepts the referral, and assigns the student a counselor 108. Where appropriate, feedback is sent to the individual referring the student to the SOS system 110. In this embodiment the counselor then contacts the student and discusses the issue 109. The counselor may also contact the student's instructors 111 or other persons willing to give information about the student pertinent to resolving the issue 112. In this embodiment, once the counselor has sufficiently gathered information regarding the student and assessed the student's needs, the counselor may refer the student to a resource for resolution of the issue 113.

Figure 2:
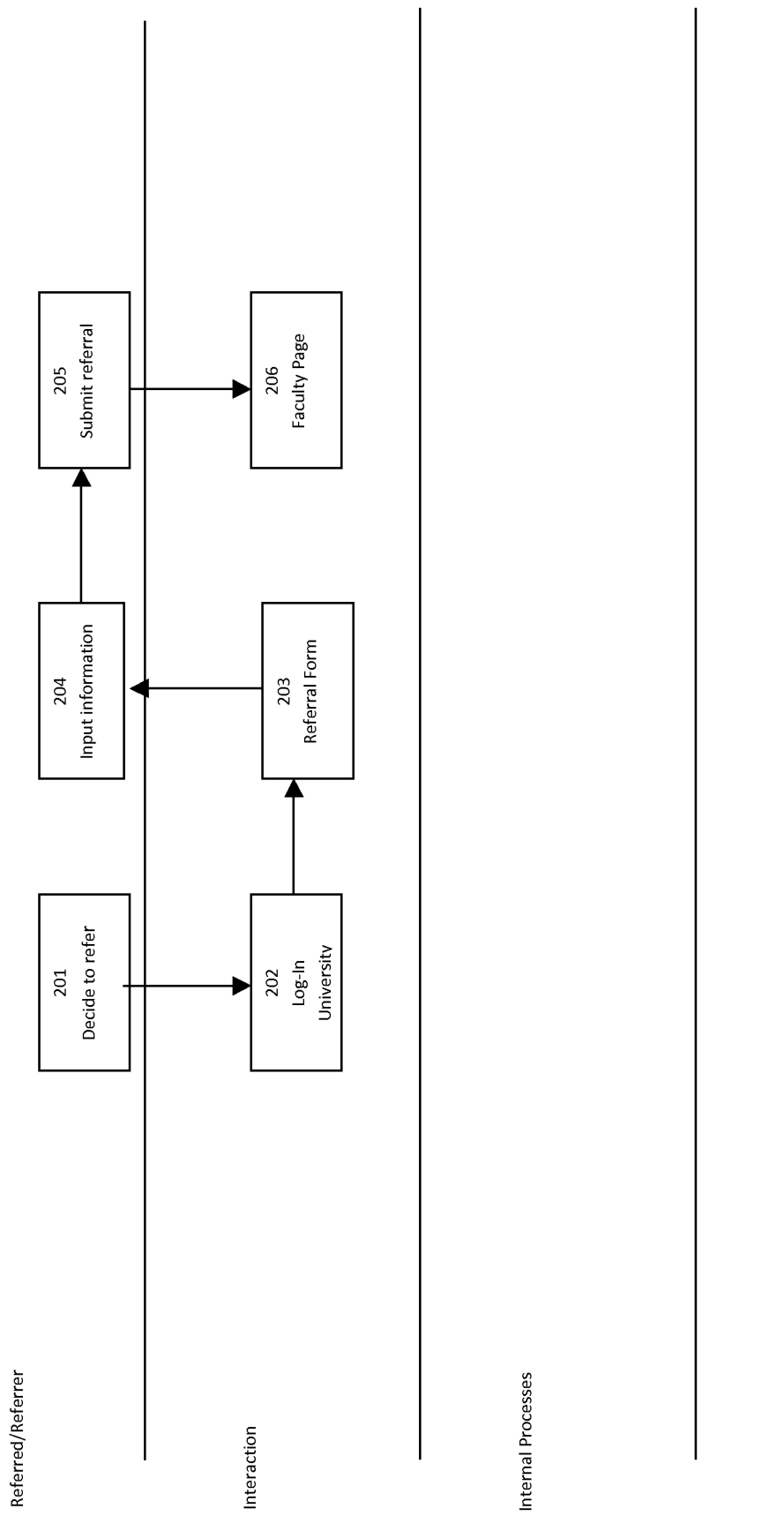
FIG. 2 illustrates the referral process by a person with a relationship to the student who is also a member of the educational institution, such as faculty, staff, or a student/peer according to an embodiment of the present invention.
Figure 3:
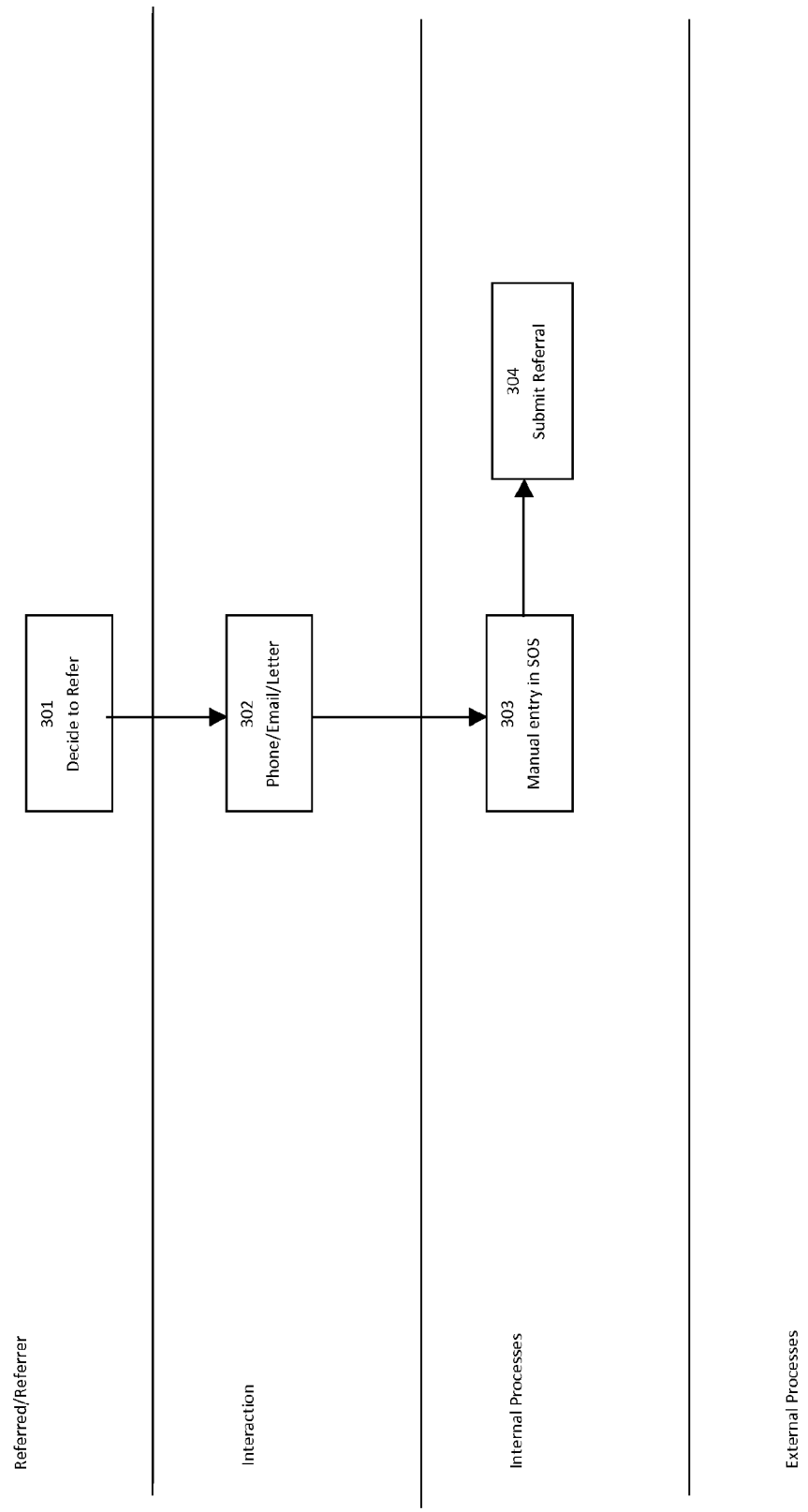
FIG. 3 illustrates the referral of the student to the system by a person with a relationship to the student outside of the educational institution, such as a parent or peer according to an embodiment of the present invention.

By way of illustration and not as a limitation, the relationship between the institution and the student in need starts with the initial contact stage wherein the student is referred to the SOS system, either through a network interface [FIG. 2] or by other suitable means [FIG. 3] (such as telephone). In one embodiment using a network interface, as illustrated in FIG. 2, the person referring the student decides to refer the student 201, logs into the institutions network 202, and opens the referral form 203. The person fills out the form 204 and submits it to the SOS system. Upon submission, the referral is stored 205, and the person is returned to their home page 206.

FIG. 3 illustrates the process of making a referral without using the educational institution's network interface. In this embodiment the person decides to refer the student 301, and contacts the institution 302. The information is received by an individual at the institution and manually input into the referral form 303. At this point the referral is submitted 304. As will be apparent to those skilled in the art, other forms of making a referral to the institution may be established without departing from the scope of the present invention.

An exemplary referral form is provided in FIG. 3a. Here the student and the type of need the student is experiencing are identified. Some types of needs that may be identified include, but are not limited to; (1) academic issues, such as: grades, homework, attendance, transferring/withdrawing, (2) physical/mental health issues: illness, need of encouragement, adjustment/personal issues, test anxiety, (3) major/career issues: undecided major, unsuitable major, internship or practicum placement issues, (4) other issues: crisis at home, financial, residential, chapel attendance, as well as allowing the referring person to identify any other issues the student may be experiencing. The referring individual may also include whether they have contacted the student about the issue before making the referral. As those skilled in the art will appreciate, other such forms may sufficiently indicate the student needs to the institution without departing from the scope of the present invention.

Figure 4:
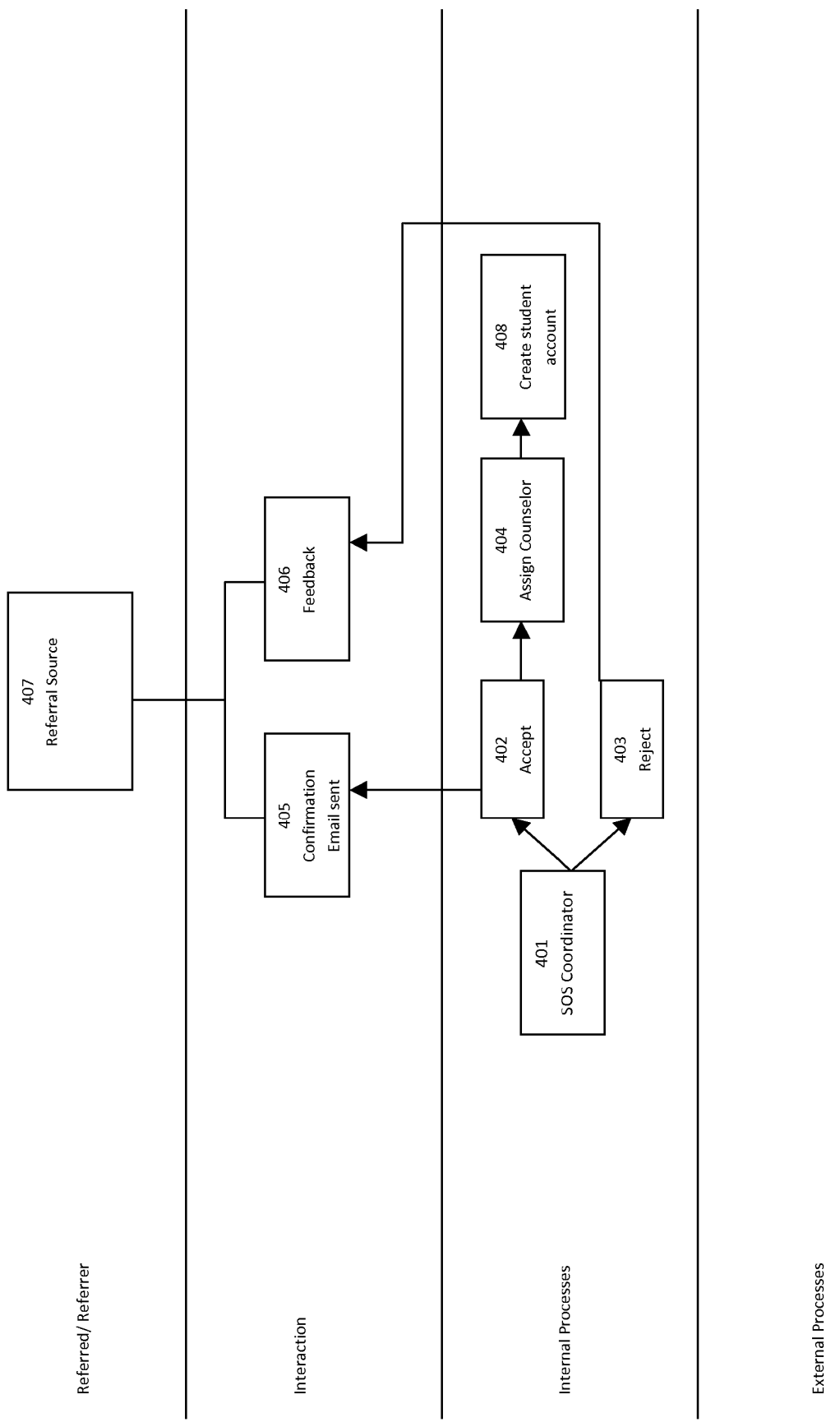
FIG. 4 illustrates the process of the SOS coordinator choosing either to accept or reject a referral, where accepted the student is assigned a counselor according to an embodiment of the present invention.

FIG. 4 illustrates the acceptance or rejection of the referral, once a referral is submitted through the university network according to one embodiment of the present invention. In this embodiment, the referral is received by the SOS system coordinator 401, who reviews the referral and determines whether or not the referral is appropriate. In one embodiment, if the referral is not appropriate it is rejected 403. After rejection, feedback 406 will be given to the person making the referral and any other persons in the student's Circle of Care 407 notifying them that the referral was rejected. In another embodiment, if appropriate, the referral is accepted 402 into the SOS system. Upon acceptance, the student is assigned a counselor 404 by the SOS coordinator. Additionally, in this embodiment after acceptance a confirmation email is sent 405 as well as feedback 406 to the person making the referral and to other designated Circle of Care members 407. The feedback 406 transmission notifies such persons that they will be updated on the student's progress in through the SOS system when appropriate. In one embodiment the feedback transmission 406 includes a means to access a designated area in the network that indicates the student's progress in the system.

In one embodiment, when the student is accepted into the system, a file in the SOS system software is created for the student. The file created includes the student's name, the student's identification number, contact information, the student's parent information, if applicable, and the course of study. In one embodiment such information is automatically gathered from software already in use by the educational institution for the purposes of storing such information. As will be apparent to those skilled in the art, other forms of determining acceptance into the system and creating a student file may be established without departing from the scope of the present invention.

In another embodiment, the student may be assigned a "coach" who is someone outside of the educational institution's counseling services but is an appropriate individual to assess and address the student's needs. In yet another embodiment, the student may be assigned a counselor outside of the educational institution altogether. In still another embodiment the counselor is an employee of the educational institution.

Figure 5:
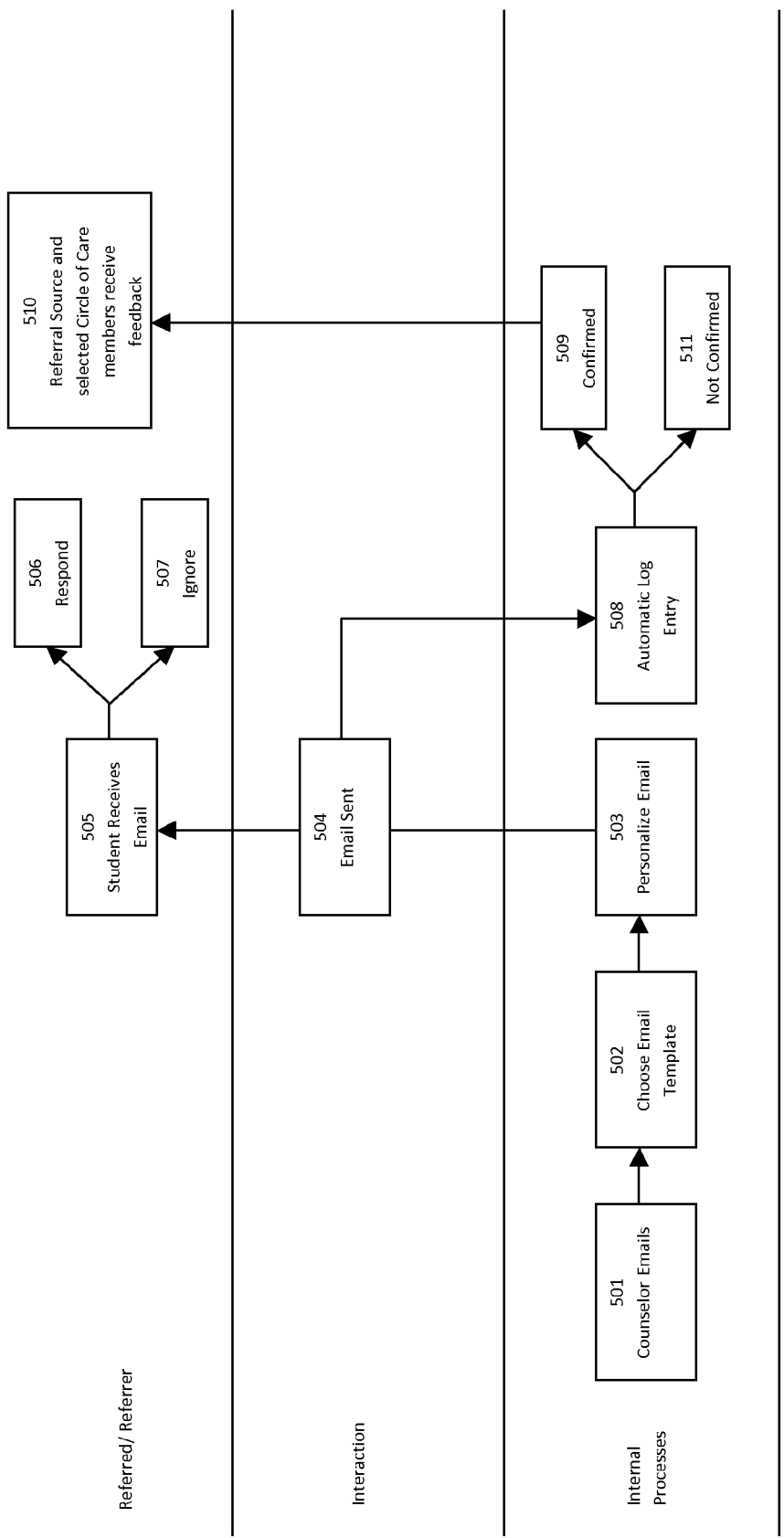
FIG. 5 illustrates a flow diagram of an exemplary counselor contact process wherein the student is contacted via email according to an embodiment of the present invention.

In an embodiment of the present invention, the counselor will then initiate contact with the student. In one embodiment the student is contacted by the counselor via e-mail, FIG. 5. In this embodiment the counselor opens his or her e-mail 501, then chooses an e-mail template 502, and personalizes the e-mail 503. In this embodiment, templates provided by the SOS software system cover a variety of general transmissions that are used to initiate contact based on the perceived student need. After the e-mail is personalized 503, it is sent to the student 504. By sending the e-mail, an automatic log entry 508 is made into the student's SOS system file. At this point the counselor will determine whether to send feedback to the referral source and to selected Circle of Care members letting them know that the counselor has attempted to contact the student. Feedback transmission may either be confirmed 509, in which case the referral source and selected Circle of Care members will receive feedback 510, or not confirmed 511 in which case no feedback is sent. Once the student receives the e-mail 505, he or she may choose to respond 506 or ignore 507 the counselor's e-mail.

In another embodiment of the present invention, the student is contacted via telephone or voicemail. If unavailable by this method, the counselor may contact the student via electronic mail [FIG. 5], in-person, perhaps with the assistance of other personnel at the institution, such as a resident advisor, or any other available method. Such attempts to contact the student and the contact itself are logged into the student's file within the SOS system. However, it is important to note that entries describing contact are edited so that the confidentiality rights of the student are not compromised. If all attempts to contact the student fail, there is no resolution of the student's file. As those skilled in the art will appreciate, other forms of contacting the student may be established without departing from the scope of the present invention.

Figure 6:
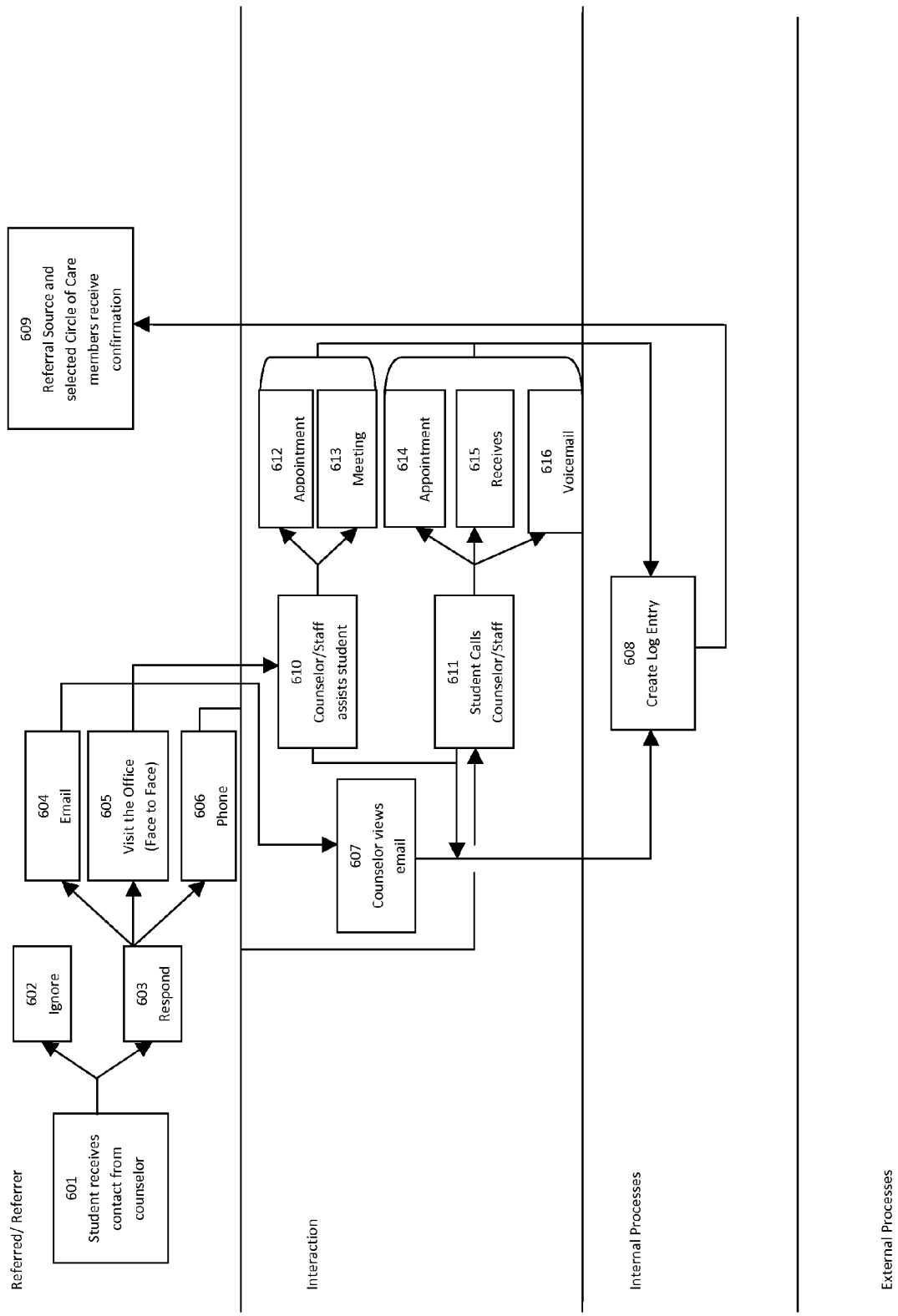
FIG. 6 illustrates a flow diagram of potential student response to receiving an e-mail or phone call from the counselor according to an embodiment of the present invention.

Once contacted, the student may respond in various ways according to one embodiment and illustrated in FIG. 6. Once the student views the e-mail from the counselor 601, the student may either ignore the e-mail 602, or respond 603. The response 603, may take various forms; including, but not limited to e-mail 604, visiting the counselor's office 605, or telephoning the counselor 606. Where student chooses to return the counselor's e-mail with an e-mail 604, the counselor will then view the e-mail 607, and create a log entry into the student's SOS system file 608. The counselor then will determine whether to send feedback to the referral source and selected Circle of Care members stating that the student has contacted the counselor 609. If the student decides to respond to the counselor's initial contact by visiting the counselor's office 605, the counselor or other staff will assist the student 610 in either making an appointment 612 if the counselor is unavailable at the time, or having a meeting with the counselor 613, if the counselor is available. In either case a log entry will be created 608. The counselor then will determine whether to send feedback to the referral source and selected Circle of Care members stating that the student has contacted the counselor 609. Thirdly, if the student decides to respond to the counselor's initial contact by telephoning the counselor 611, the call will be received by the counselor or other staff, at which point either a future appointment may be made 614, if the counselor is unavailable or busy, the counselor may receive the phone call and discuss the issue with the student 615, or the student may leave a message with the counselor via voicemail 616. In any case, a record of the student's phone call will be made by the counselor creating a log entry 608. Again, the counselor then will determine whether to send feedback to the referral source and selected Circle of Care members stating that the student has contacted the counselor 609. Other methods of returning contact with the counselor by the student may be established without departing from the scope of the present invention.

In one embodiment it is optimal for the student and the counselor to meet in-person to discuss the student's issues. In another embodiment the student interview may be conducted in an otherwise appropriate manner. A face-to-face meeting or "student interview" is described in FIG. 7. By means of illustration and not limitation, first the student decides whether to meet with the SOS counselor 701. The student may decide not to meet with the counselor 702, in which case the issue will not be resolved. Where the student decides to meet with the counselor 703, at such a meeting there is a rapport building stage 704 where the counselor engages in active listening, supporting, encouraging, getting to know the student, building a trusting relationship and offering assistance with the presented issue. After a rapport is built, the counselor and student may collaboratively make a decision on an appropriate course of action 705. The occurrence of such a meeting is logged into the student's SOS system file 706 noting the time and place of the meeting, how long the student and counselor met and the outcome of the meeting. At this time feedback 707 may be sent to the referral source and selected members of the student's Circle of Care 708 giving a means to view general information regarding the meeting.

Figure 8:
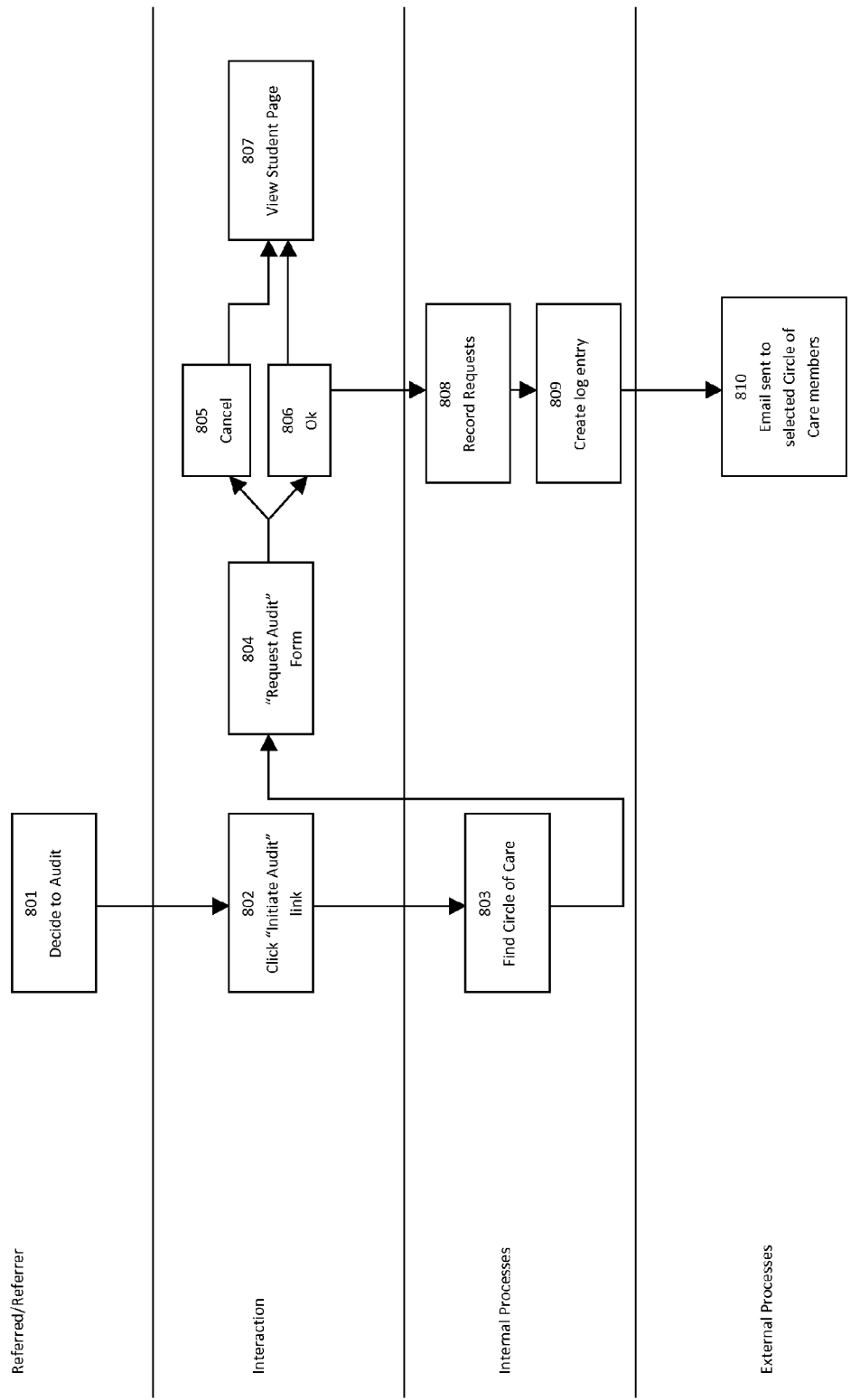
FIG. 8 illustrates a flow diagram of an exemplary initiation of the audit process sent to the student's instructors at the institution by the counselor according to an embodiment of the present invention.

In an embodiment of the present invention, where appropriate, the counselor may initiate an audit as illustrated in FIG. 8. An audit comprises contacting the student's instructors and asking for feedback on the student's performance, attendance and behavior in their courses. In this embodiment, when the counselor decides to audit the student 801, the counselor logs into the SOS system and clicks on the "initiate audit" link 802. This allows the SOS system software to find the student's Circle of Care, which includes the student's current instructors and a request audit form will appear 803 & 804. The counselor may decide to continue initiating the audit by clicking okay 806, or cancel the request 805. If the request is cancelled, the counselor will be returned to the student's SOS system page 807. If the counselor decides to continue to initiate the audit and clicks okay 806, then the record requests are sent to the student's instructors 808. After the requests are sent, a log entry in the student's SOS system file is created 809, and an e-mail notifying Circle of Care members that the audit was initiated may be sent 810. In another embodiment an audit may be conducted by suitable methods other than electronic mail. As those skilled in the art will appreciate, other forms of contacting the student may be established without departing from the scope of the present invention.

Figure 9:
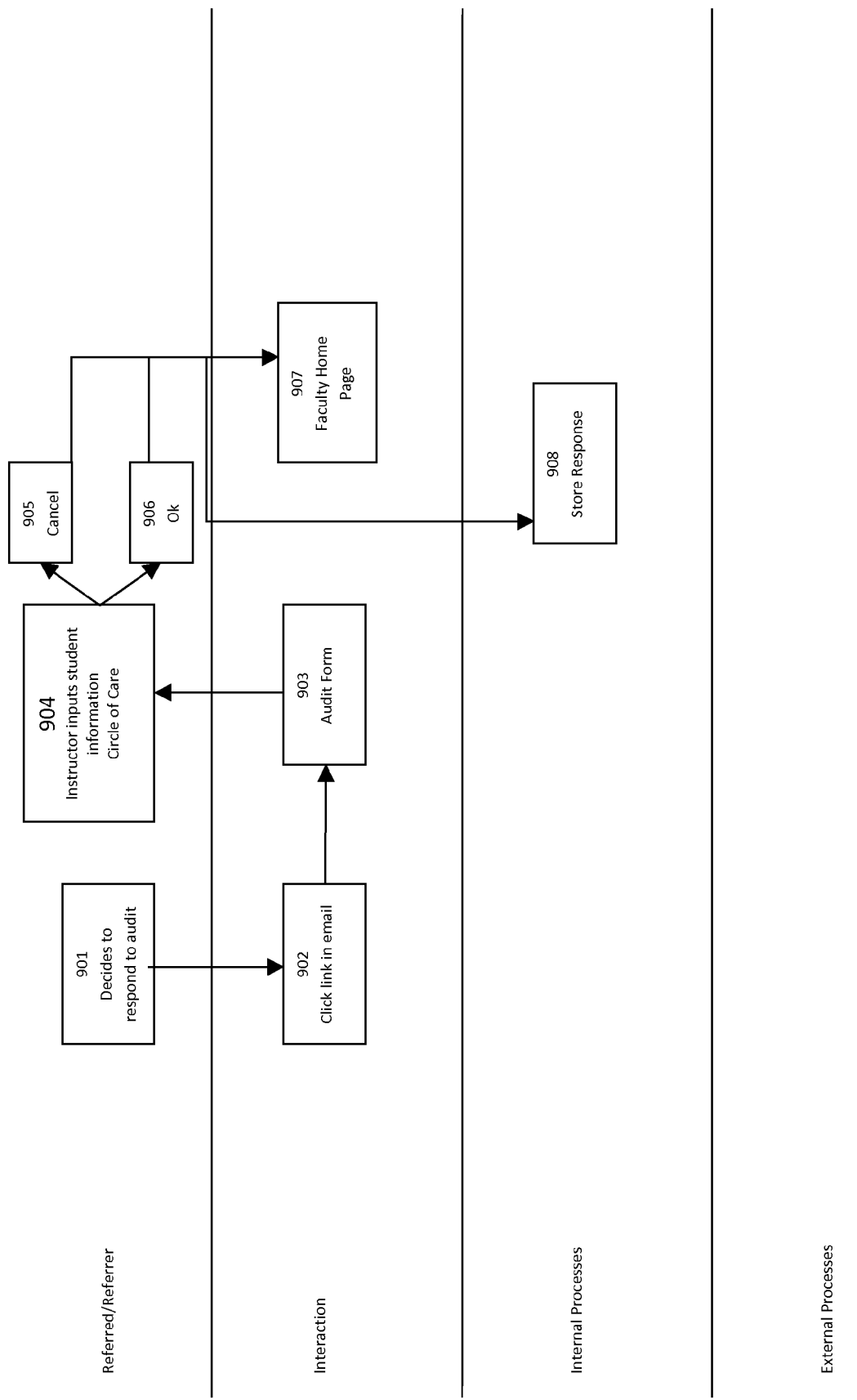
FIG. 9 illustrates a flow diagram of an exemplary faculty response to the audit request sent by the counselor according to an embodiment of the present invention.

In one embodiment the student's instructors may respond to the audit using the institution's network interface. In another embodiment the instructor may respond to the audit by other suitable means. Where the instructor responds to the request using the network interface, as illustrated in FIG. 9, the instructor first decides to respond 901. On deciding to respond, the instructor clicks on a link within the e-mail sent from the counselor 902, and accesses the audit form 903. The instructor inputs pertinent student information 904. The form also gives the instructor the option to be included in receiving information on the student as they move through the system. If the instructor affirmatively indicates as such, he or she will be added to the student's Circle of Care. Once the form is complete, or at any other time, the instructor may cancel out of the form 905 and be returned to his or her faculty home page 907. If the instructor intends to submit the form, he or she will click okay 906 and the audit response will be stored into the student's SOS system file 908. Upon submission the instructor will be returned to his or her faculty home page 907. Audit information is received by the counselor from the instructors through the SOS software system. The counselor, now with a holistic picture of the student's situation, may then again assess the student's particular needs in resolving the issue.

Figure 10:
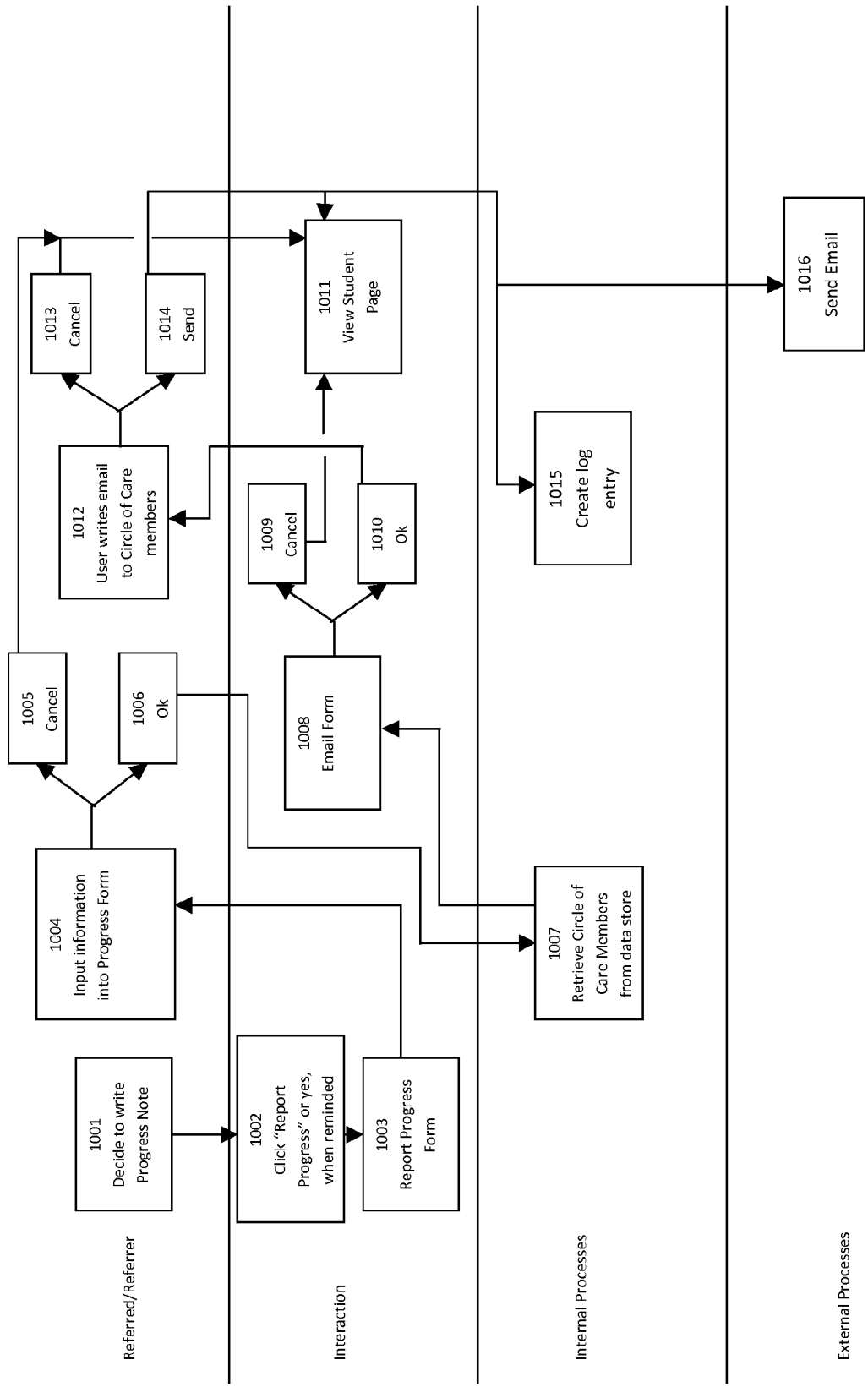
FIG. 10 illustrates a flow diagram of an exemplary process of sending a progress report regarding the student by the counselor to a member of the Circle of Care according to an embodiment of the present invention.

FIG. 10 illustrates the process of sending a progress report in one embodiment of the present invention. Progress reports may be sent by the counselor to members of the student's Circle of Care periodically when deemed appropriate by the counselor. In this embodiment of the present invention, when the counselor decides to send such a progress report 1001, the counselor using the network interface, may click on a "report progress" link within the SOS software system 1002, this will allow the counselor access to the report progress form 1003. The counselor will then input information into the form 1004, at which point the counselor may either cancel 1005 or continue 1006 submitting the form. The information that is put into the form will be screened to maintain the confidentiality interests of the student. If the counselor indicates that he or she would like to continue with the progress report, the software will retrieve the Circle of Care member's information 1007, and an e-mail form 1008 will appear for the counselor to fill out. Again, at this point the counselor may either cancel the process 1009, in which case he or she will be returned to the student's SOS page 1011. If the counselor continues with the progress report 1010 an e-mail is drafted to the Circle of Care members 1012. This drafted e-mail may either be canceled 1013, or sent 1014. In either case, the counselor is returned to the student's SOS page 1011. Where an e-mail is sent 1016, a log entry in the student's SOS system file is created 1015. In another embodiment of the invention, a progress report may be given to a member of the student's Circle of Care by any other means, such as telephone or postcard. Other methods of transmitting information regarding the progress of the student within the SOS system may be established without departing from the scope of the present invention.

Figure 11:
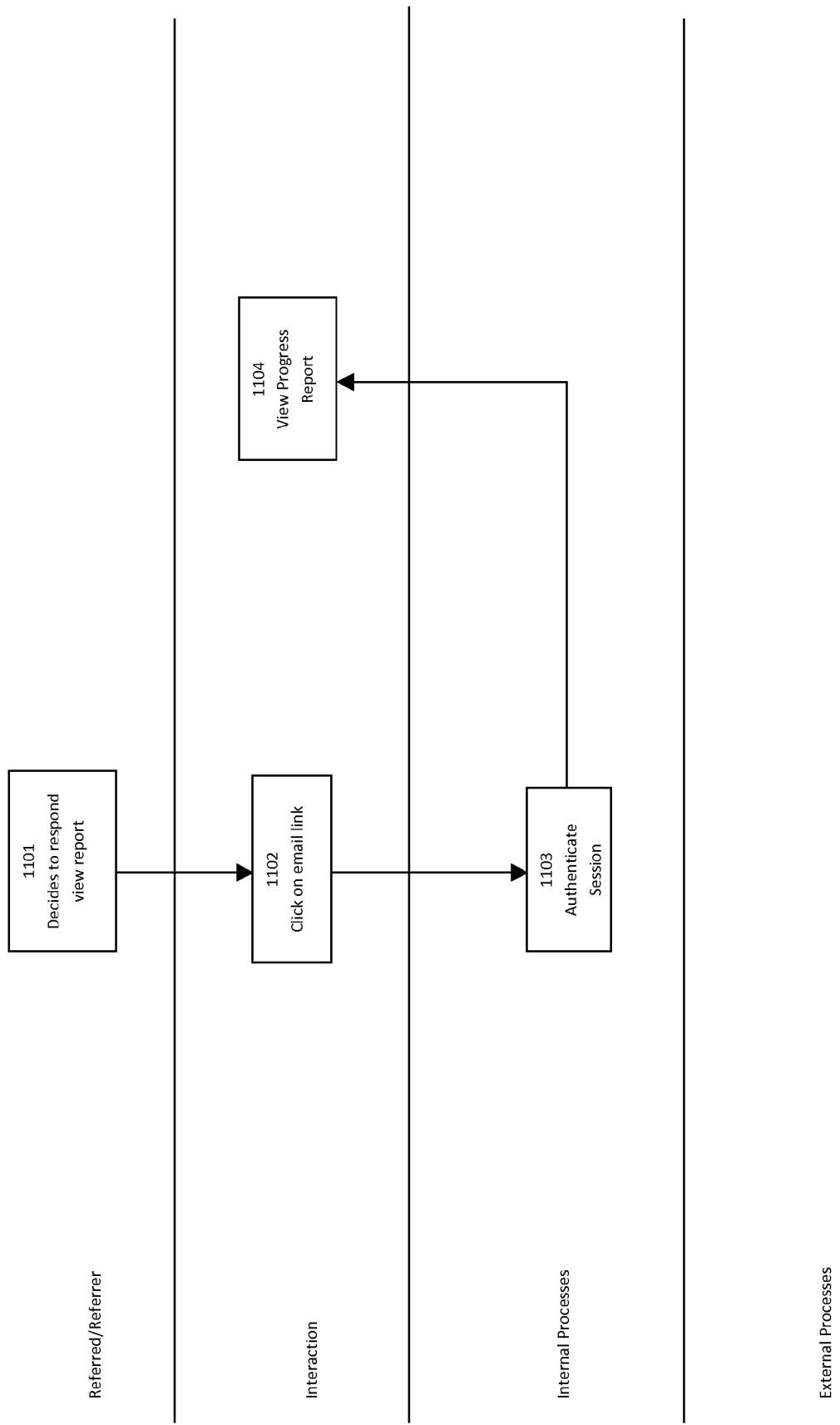
FIG. 11 illustrates a flow diagram of an exemplary faculty or other member in the Circle of Care receiving the progress report according to an embodiment of the present invention.

Upon receiving a progress report, a faculty or staff or student at the institution may respond in various ways as illustrated by FIG. 11. By way of illustration and not of limitation, where the individual decides view the report 1101, the individual clicks on the e-mail link, 1102, and authenticates his or her session on the network 1103. Once authenticated, the individual may view the report 1104.

Figure 12:
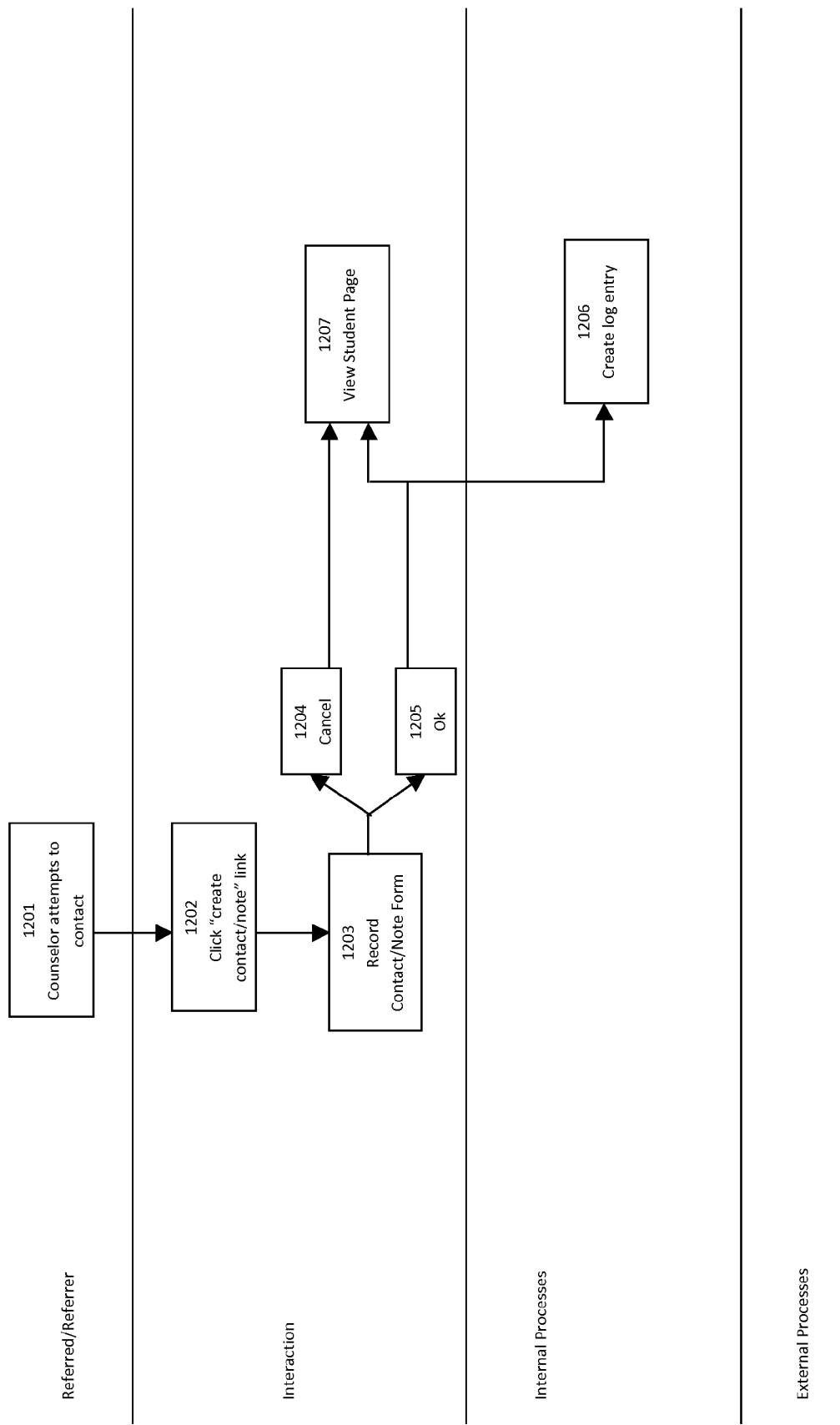
FIG. 12 illustrates a flow diagram of an exemplary record note or contact made in the student's file while part of the system according to an embodiment of the present invention.

In one embodiment the counselor may create a record note or contact in the student's SOS system file as illustrated by FIG. 12. In this embodiment, when the counselor attempts to contact the student 1201, the counselor may enter the network system and click on a link to "create contact/note" 1202. At this time the record contact/note form 1203 will appear. The counselor may cancel 1204 the action, at which time he or she will be returned to the student's SOS page 1207. If the counselor okays the transaction 1205, a log entry will be created 1206, and the counselor will be returned to the student's SOS page 1207.

Figure 13:
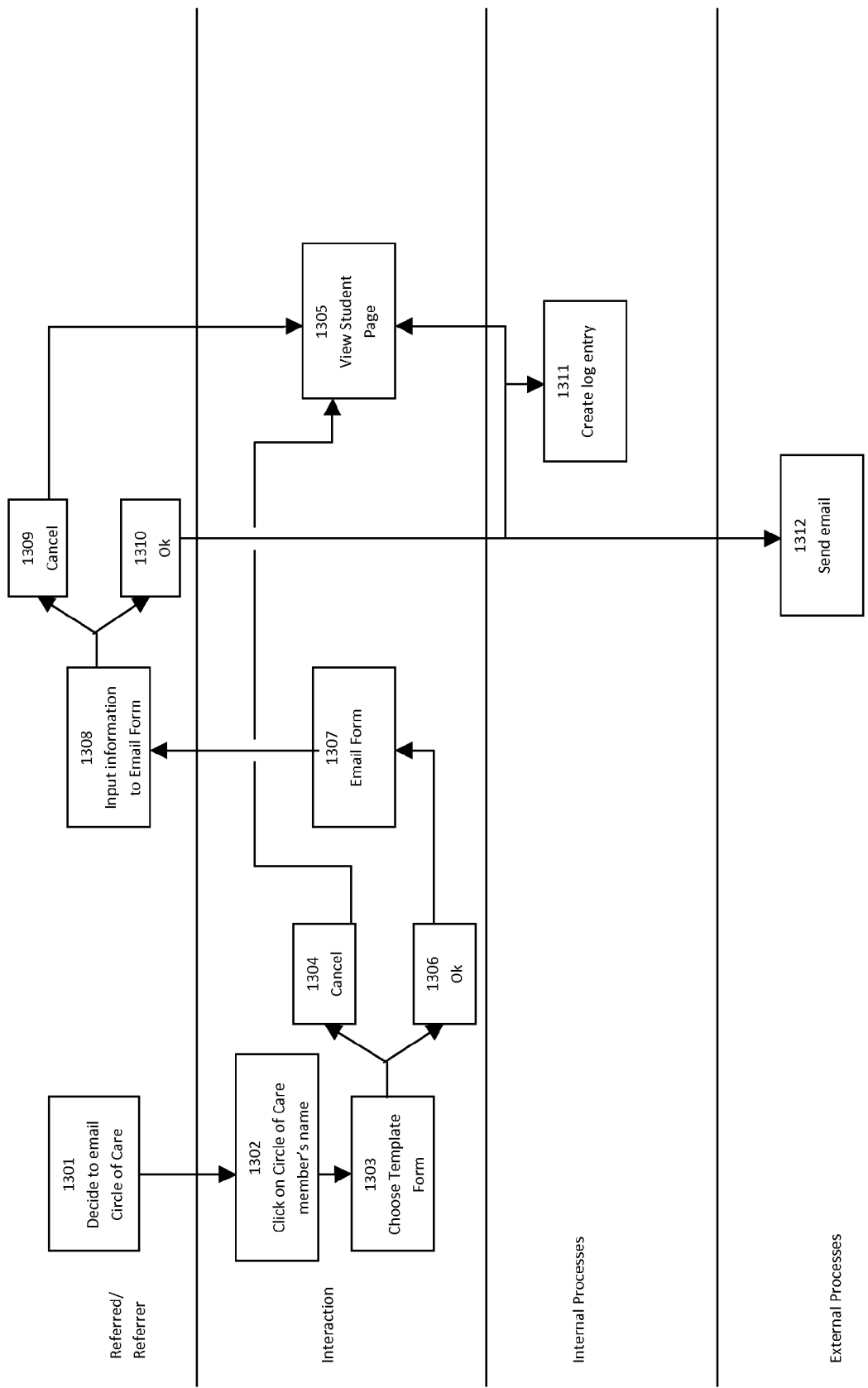
FIG. 13 illustrates a flow diagram of an exemplary e-mail sent to a Circle of Care member by the counselor according to an embodiment of the present invention.

In another embodiment of the present invention the counselor may wish to send an electronic mail to the Circle of Care Members. This embodiment is illustrated in FIG. 13. In this embodiment the counselor makes the decision to e-mail a Circle of Care member 1301, and clicks on the Circle of Care member's name contained in the student's SOS page 1302. The counselor then chooses a template form 1303 that will address the purpose of the e-mail. If the counselor cancels the transaction 1304 at this time he or she will be directed to the student's SOS page 1305. If the counselor continues 1306, the e-mail form will appear 1307, and the counselor will input the information into the form 1308. Note, that any information will be screened to maintain the student's interest in confidentiality. The counselor may cancel out of the process at this point 1309, wherein he or she will be directed to the student's SOS page 1305. If the counselor decides to send the e-mail 1310, then the e-mail is sent 1312, and a log entry is created in the student's SOS system file 1311. As will be apparent to those skilled in the art, other forms of communicating with Circle of Care members may be established without departing from the scope of the present invention.

Figure 14:
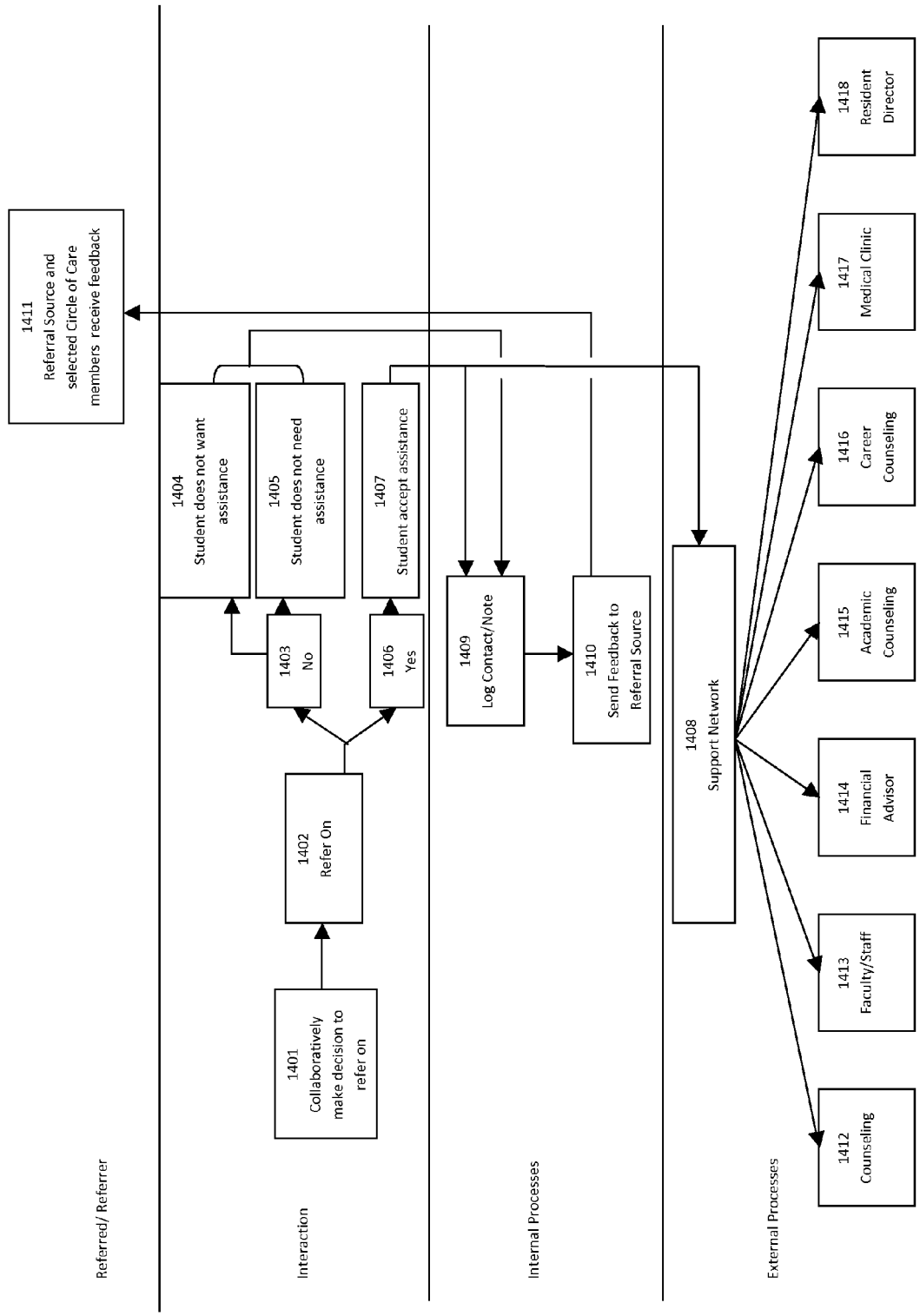
FIG. 14 illustrates a flow diagram of an exemplary referral process with support network of the student by the counselor according to an embodiment of the present invention.

In one embodiment, where appropriate, the counselor may then refer the student to an appropriate resource with a support network for resolution FIG. 14. In this embodiment the counselor and student collaboratively make a decision on whether to refer the student's issue to a resource 1401. The counselor and student collaboratively determine what the issue is 1402. At this time a referral may not be made to another resource 1403 where student does not want assistance 1404, or the student does not need assistance 1405. If no referral is made, then a log entry is made 1409 in the student's SOS system file and feedback 1410 may be sent to the referral source and other selected members of the Circle of Care 1411. Where the counselor and student determine that a referral should be made 1406, and the student accepts assistance 1407, the student is referred to someone in the institution's support network 1408. Such a network comprises a counseling center 1412, faculty or staff 1413, financial advisor 1414, academic counseling 1415, career counseling 1416, medical clinic 1417, or resident director 1418. If a referral is made, then a log entry is made 1409 in the student's SOS system file and feedback 1410 may be sent to the referral source and other selected members of the Circle of Care 1411. In another embodiment an institution's support network may comprise other resources outside of the institution that would be appropriate to address the student's needs. Other methods of determining an appropriate course of action for the resolution of the student's needs may be established without departing from the scope of the present invention.

In one embodiment of the present invention, the counselor may determine that the act of referring the student to an appropriate resource is enough for resolution of the student's file. In still another embodiment of the present invention, the counselor may ask that the individual to whom the student is referred to notify the counselor that positive progress has been made or the counselor may ask that the student notify the counselor that positive progress has been made after the referral to an appropriate resource. Again note that information received will be screened to maintain the student's confidentiality interests. In this embodiment, once such feedback is received, the student's file in the system is marked resolved, and the case is closed.

Figure 15:
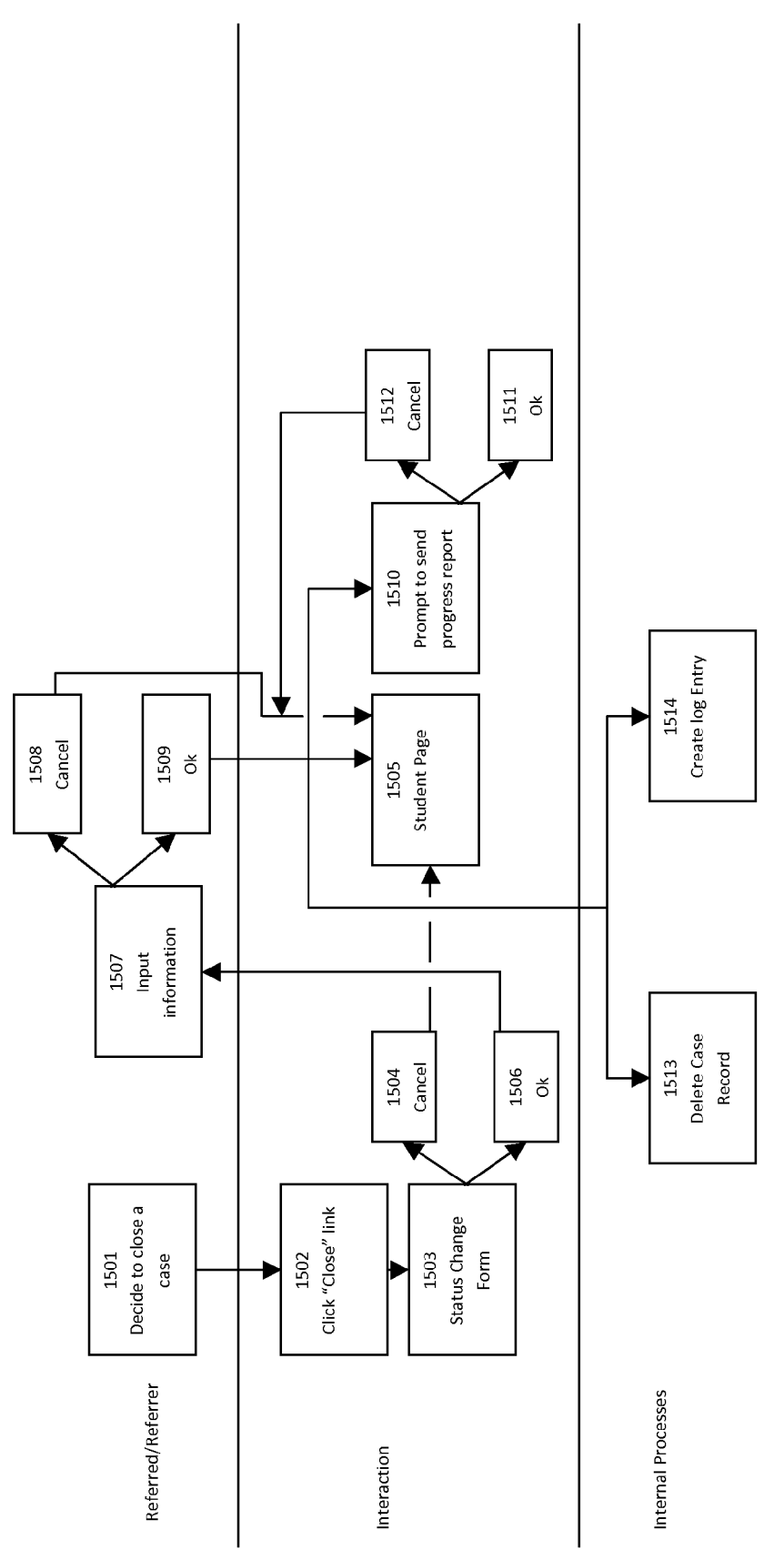
FIG. 15 illustrates a flow diagram of an exemplary close case process at resolution of the student's needs according to an embodiment of the present invention.

FIG. 15 illustrates an embodiment of closing a student's case upon resolution. Where the counselor determines that the case should be closed 1501, the counselor may click on the "close" link within the SOS software system 1502. A change status form 1503 will appear. If the counselor cancels out of this process 1504 he or she will be returned to the student's SOS page 1505. If the counselor continues, 1506 the counselor will input information 1507 regarding the case closure. The counselor again may cancel out the process 1508, or progress 1509, at which time a log entry is created 1514, the case record is deleted 1513, and a prompt to send a progress report is sent to the counselor 1510. The counselor may then proceed with the progress report 1511, or cancel out of the process 1512. In one embodiment, the marking of a student's file in the system "resolved" does not delete the file from the system in its entirety. The counselor's case notes will remain. Therefore, if the student is again referred to the system for another need or at another time, the previous file of case notes exists for the next counselor to incorporate into his or her review and assessment of the new situation.

Figure 16:
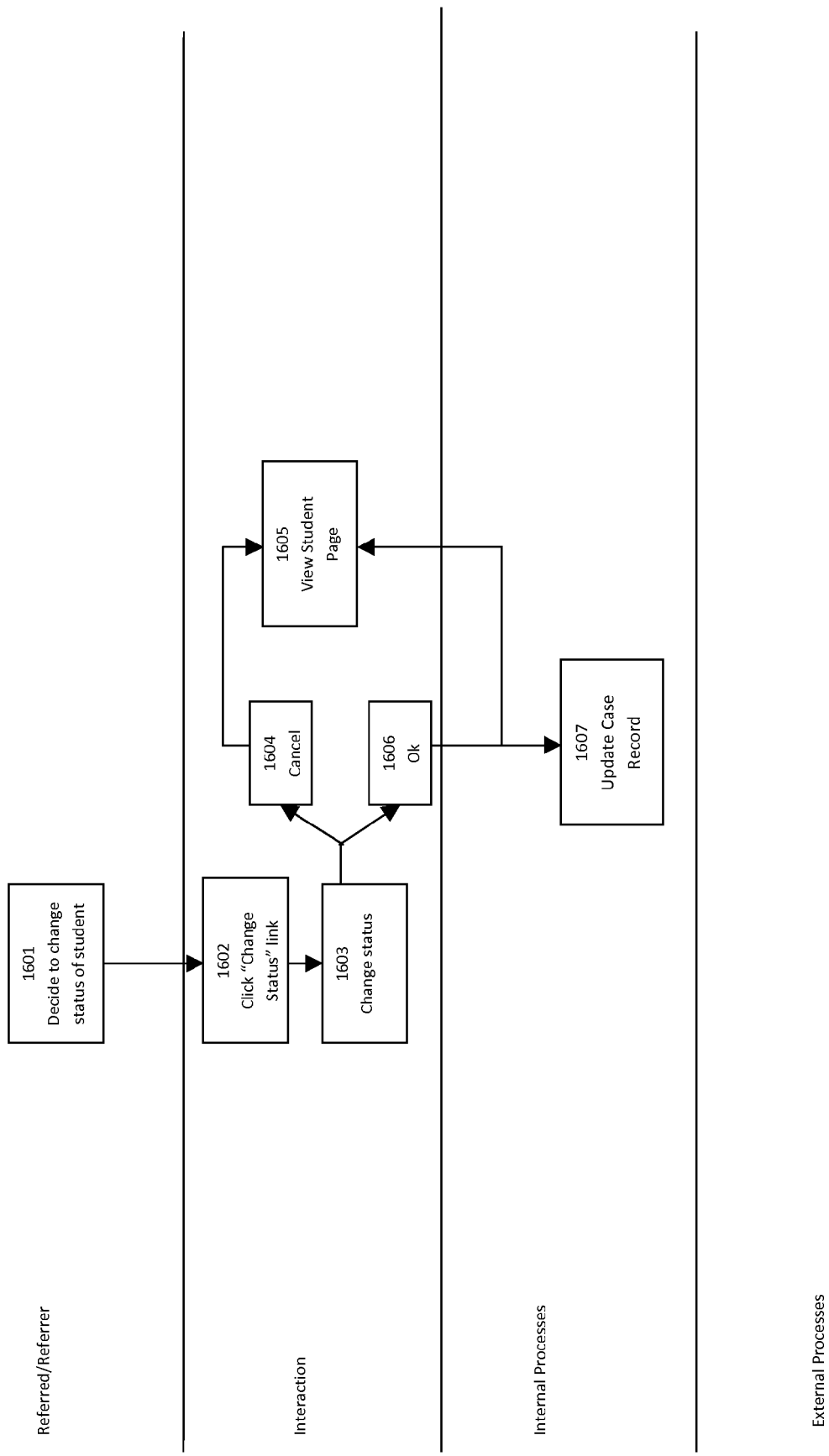
FIG. 16 illustrates a flow diagram of an exemplary change status process for use by the student's counselor according to an embodiment of the present invention.

In a further embodiment, from time to time it may be appropriate for the counselor to fill out at change of status form as illustrated in FIG. 16. Where the counselor decides to change the status of a student 1601, the counselor may click on the "change status" link within the SOS system 1602. The change status form 1603 will appear. At this time the counselor may cancel 1604 out of the process, and be returned to the student's SOS page 1605. Alternatively, the counselor may continue with the process 1606, and update the case record 1607. When this is completed the counselor will be returned to the student's SOS page 1605.

Figure 17:
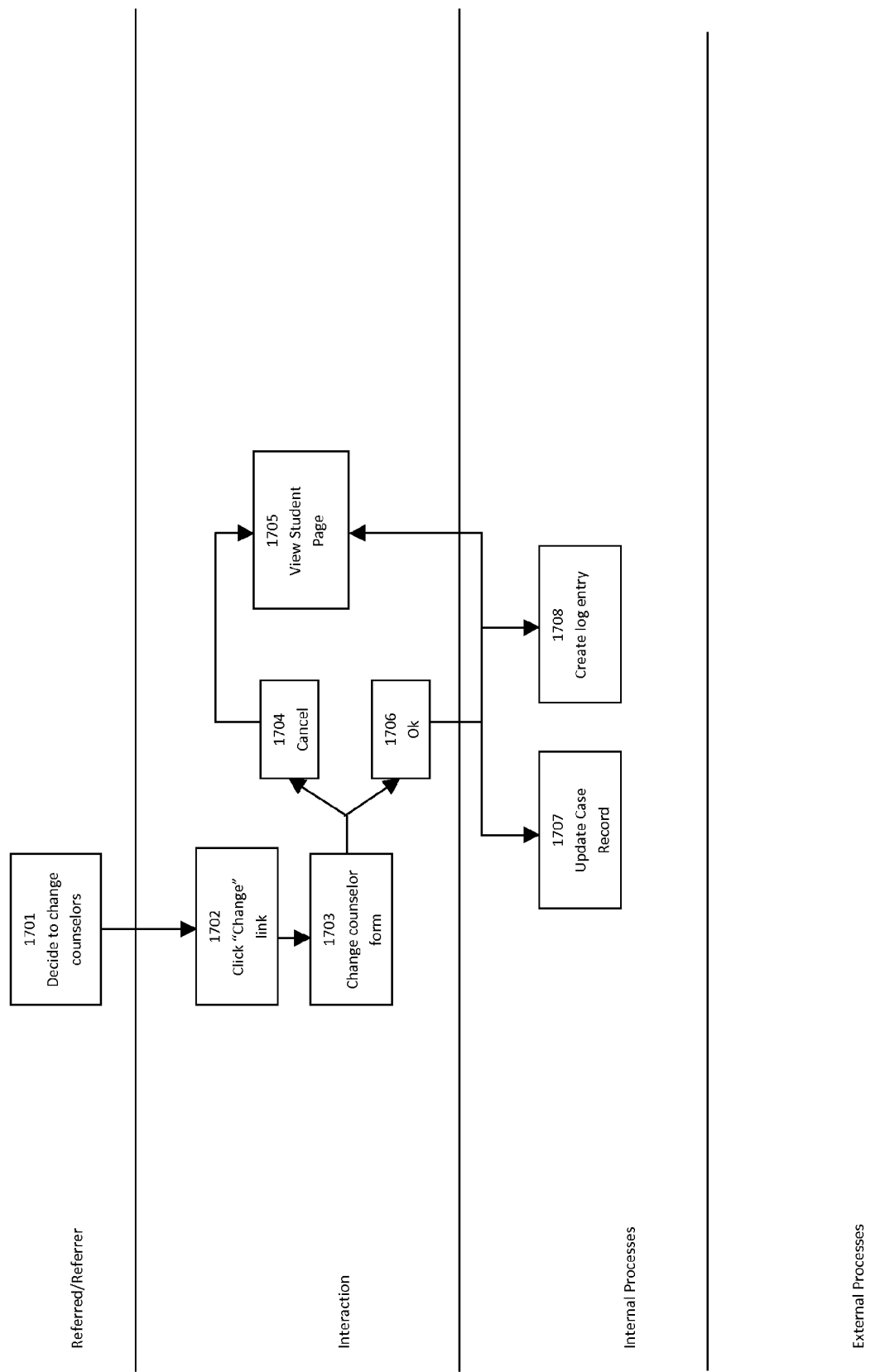
FIG. 17 illustrates a flow diagram of an exemplary process for changing counselors for use by the counselor according to an embodiment of the present invention.

In another embodiment of the present invention, it may be appropriate for a change of counselors as illustrated in FIG. 17. Where the counselor decides to transition the student to another counselor 1701, the counselor may click on the "change" link within the SOS software system 1702. The change counselor form will then appear 1703. At this time the counselor may cancel out of the process 1704 and be returned to the student's SOS page 1705. If the counselor continues, he or she will complete the form, and submit it 1706. A log entry will be created 1708, and the case record will be updated 1707.

Figure 18:
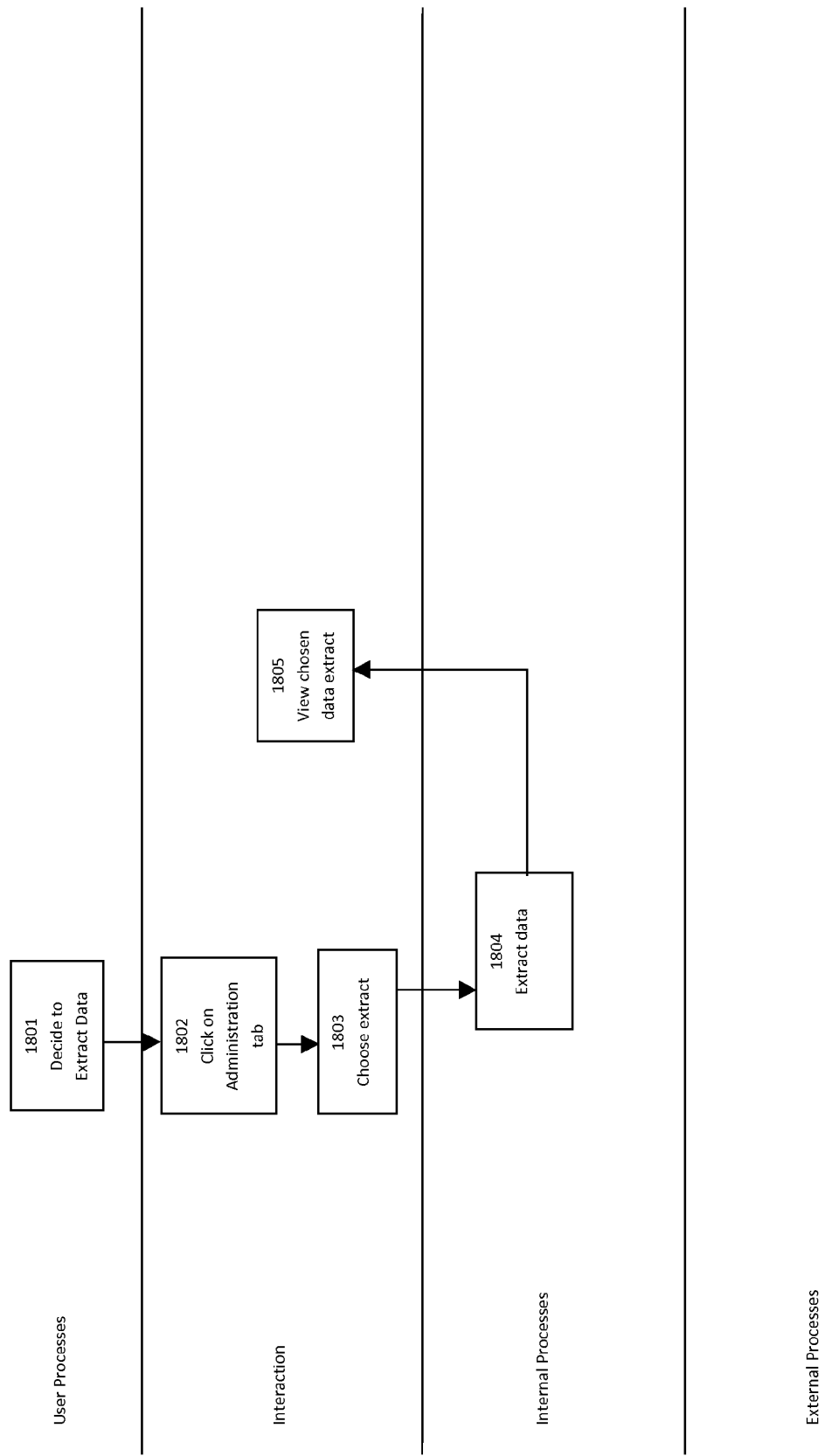
FIG. 18 illustrates a process of an authorized person at the educational system using the system software to access metrics regarding the present invention according to an embodiment of the invention.
Figure 19:
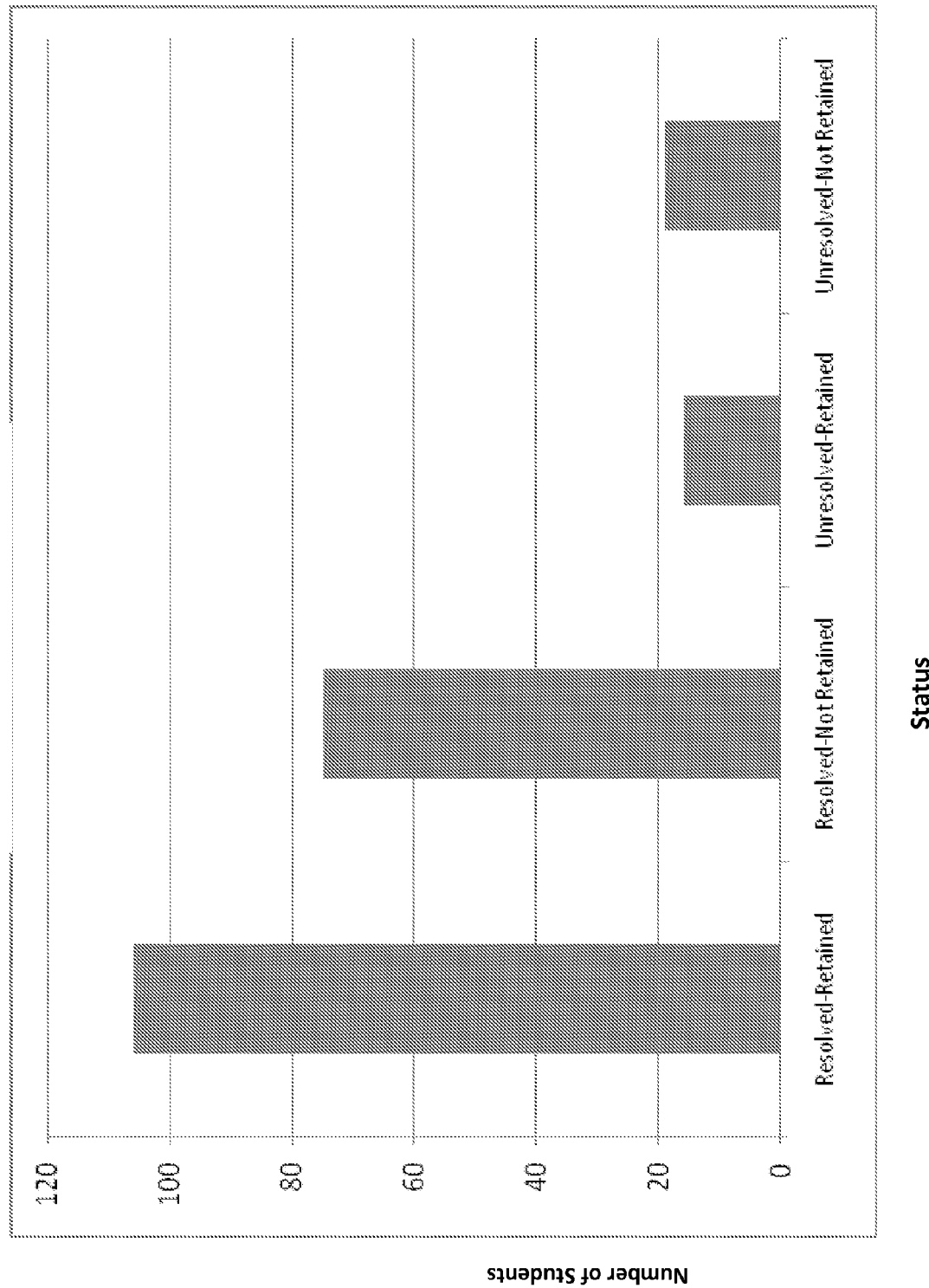
FIG. 19 illustrates the chart indicating an increase in the retention rate of freshman who used the present invention and had their issue resolved according to an embodiment of the present invention.
Figure 20:
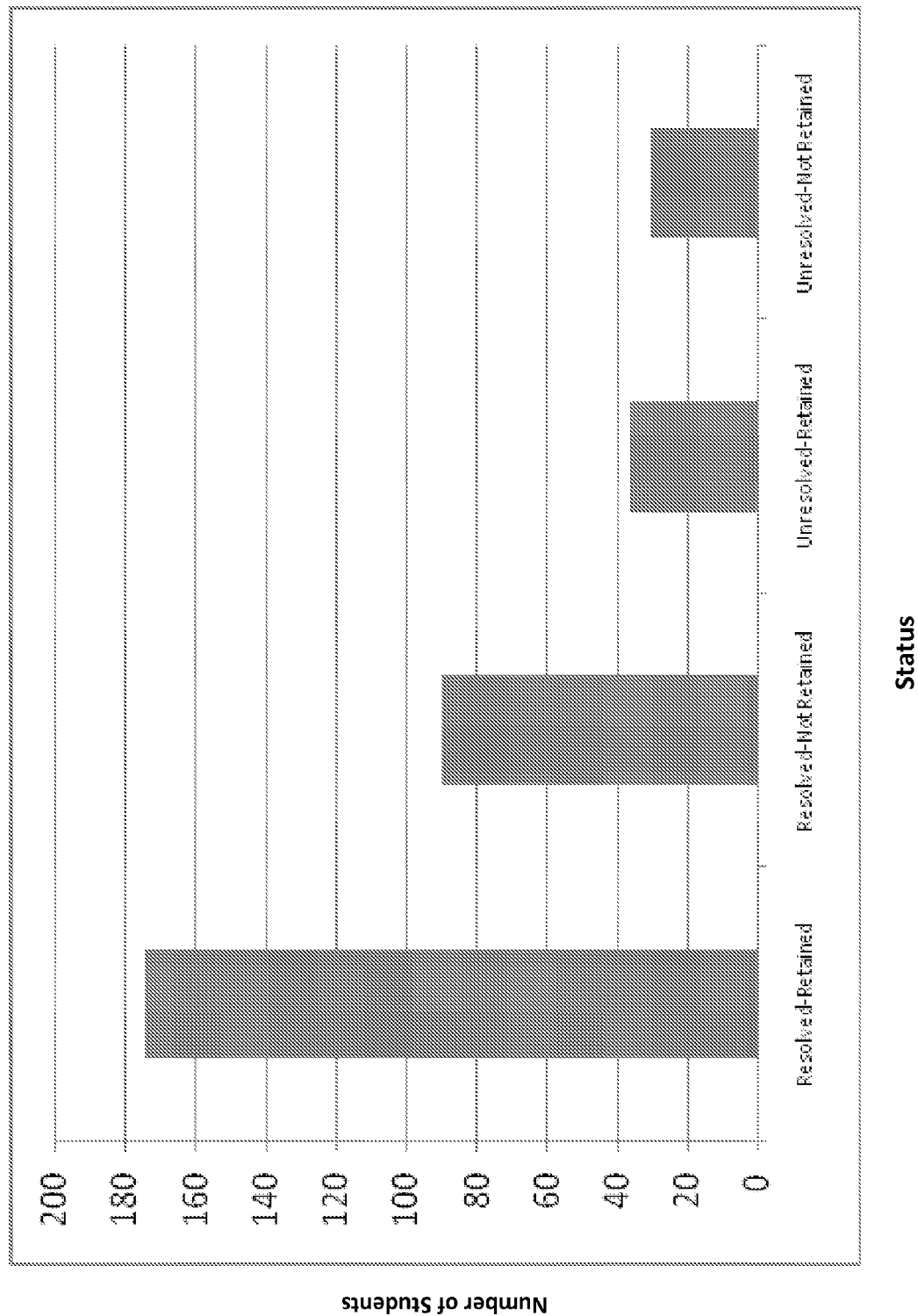
FIG. 20 illustrates the impact of resolution of student issues on retention rate of an educational institution's student body where the present invention is implemented according to an embodiment of the present invention.
Figure 21:
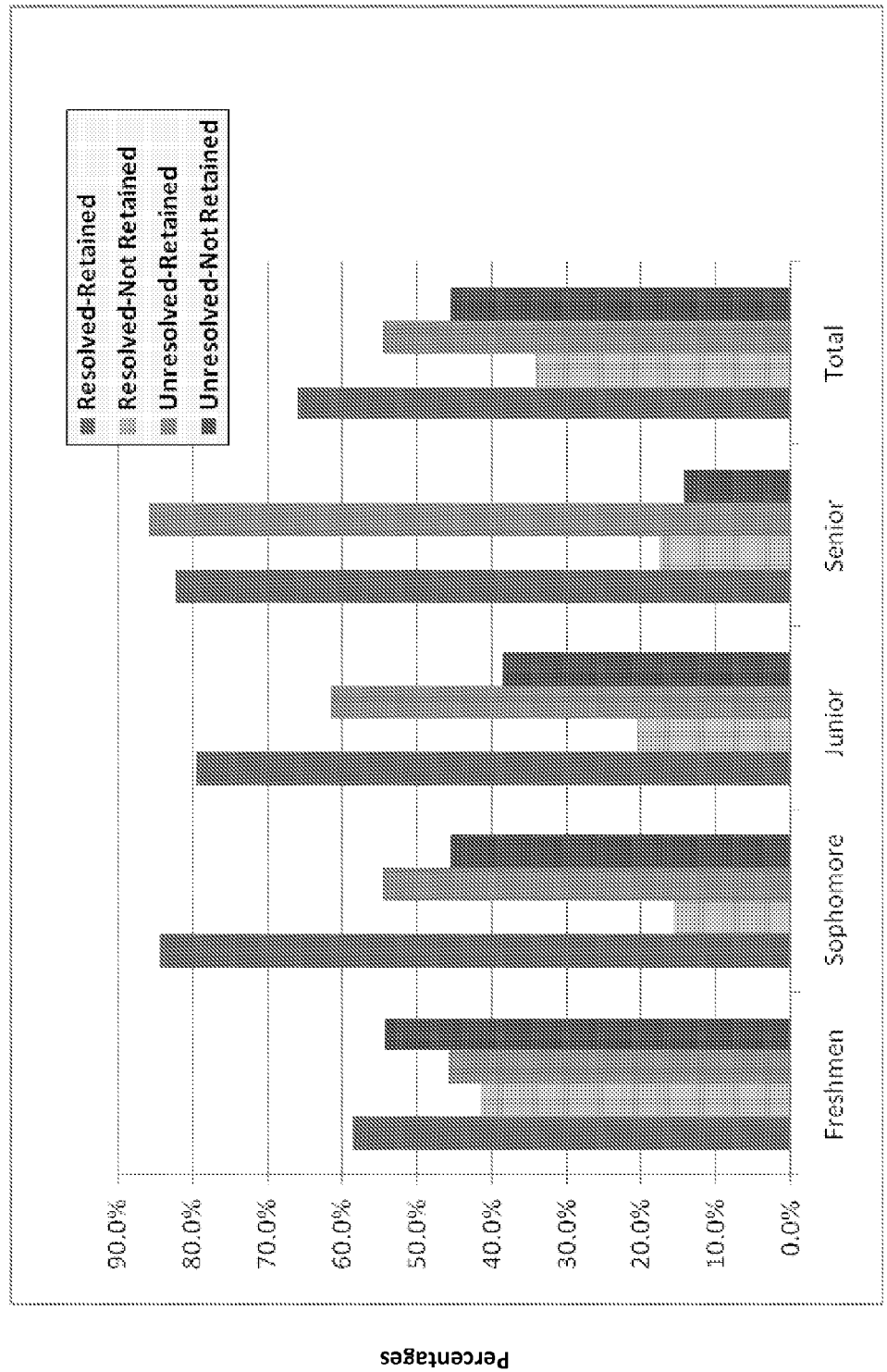
FIG. 21 illustrates the impact of resolution of student issues on retention rate of an educational institution's student body, separated by year of instruction, where the present invention is implemented according to an embodiment of the present invention.
Figure 22:
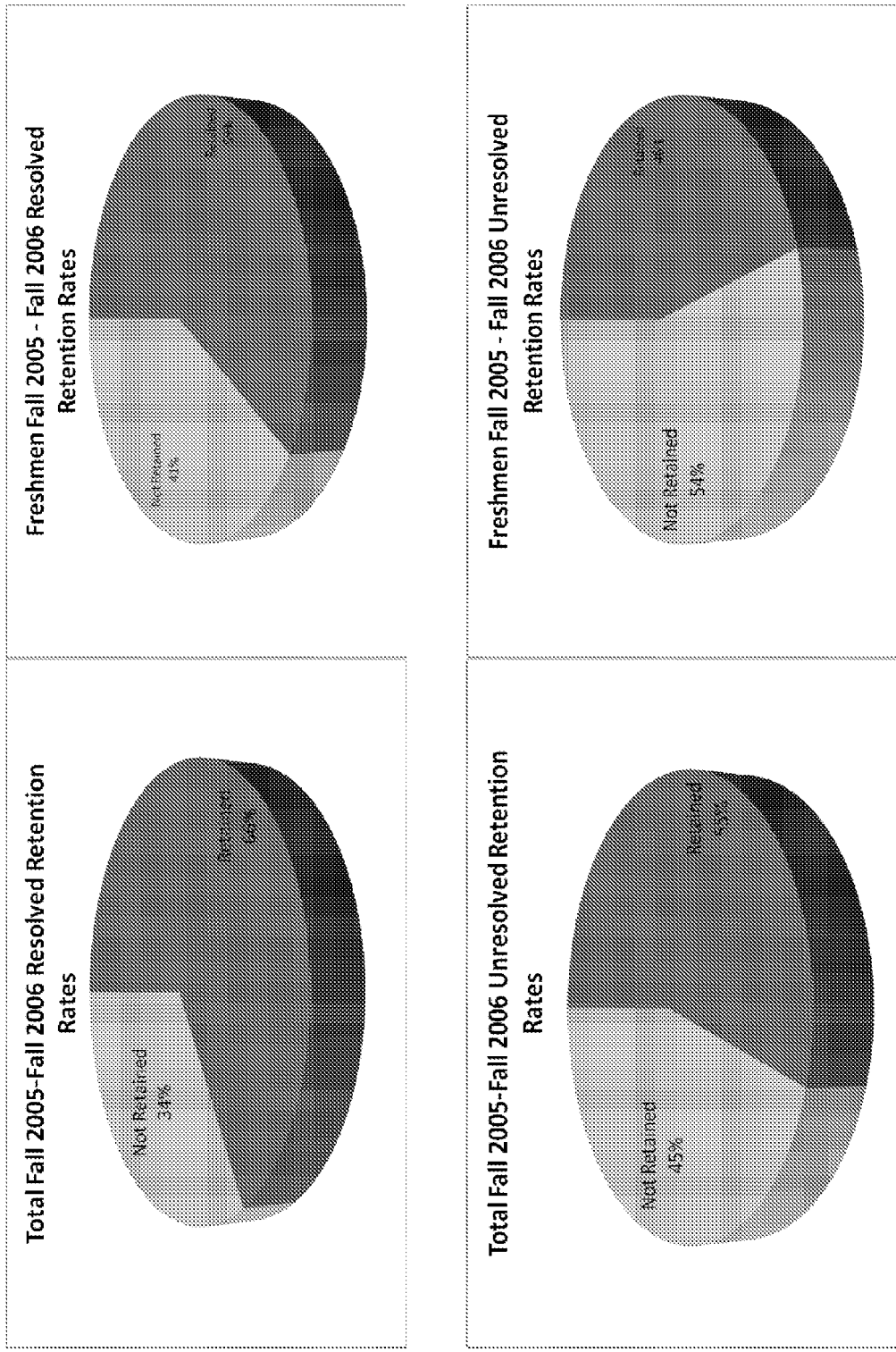
FIG. 22 illustrates the impact of resolution of student issues on retention rate of an educational institution's student body, separated into freshmen and the entire student body, where the present invention is implemented according to an embodiment of the present invention.

In another embodiment of the present invention, an authorized member of the educational institution may use software to access various metrics of the system as illustrated in FIG. 18. The authorized member first logs into the system. Once authenticated, the member decides to extract data from the system 1801. The member may then access metrics by clicking on the "administration" tab 1802. Various metrics may be accessed, and the authorized member may choose the data he or she is interested in 1803. The data is extracted 1804, and the authorized member is able to view the data chosen 1805. Charts or graphs may be easily generated from the metrics chosen through the system. Metrics that are available include but are not limited to: efficacy of specific counselors, frequency of specific issues being brought to the system, resolution frequency, affect of resolution on retention rates, affect of being in the SOS system on retention rates, and the direct impact of the system addressing student needs on retention rates at the educational institution as a whole.

WORKING EXAMPLES

Example 1

Professor notices Student has not attended class for one week. Professor accesses the network interface for the SOS system from his computer at the educational institution and indicates that he would like to make a referral by opening a link to the referral page FIG. 2. He then fills out a referral of Student FIG. 2. Professor indicates Student's name and identification number, Professor's name and department, as well as his telephone number FIG. 2. Professor then checks a box on the interface stating that he is concerned with Student's attendance FIG. 3a. Professor also indicates that he has e-mailed the student inquiring about his absence. Professor additionally indicates in the box provided that he is concerned that the student has been absent from class for one week, and did not return his e-mail. The Professor then submits the referral to the institution, by pressing a button on the referral page FIGS. 2 & 3a.

The referral is received by the SOS program coordinator FIG. 3. Because Professor sent the referral via the network system, the coordinator receives the referral in the program's inbox. The coordinator logs into the program's inbox, reviews the referral, finds that the subject matter is appropriate for assistance, and accepts the student into the system FIG. 3.

Upon acceptance, an e-mail is sent to Professor indicating that he will be to be notified as Student progresses through the system, and provides a link for Professor to use so that he may monitor Student's progress as it becomes available FIG. 3. The Professor is now in Student's Circle of Care network. Student, now accepted into the system, has a file automatically created using software designed for the system and in communication with software already employed by the educational institution that contains information such as his course schedule, name, identification number, parent information, and telephone number FIG. 3.

Student's SOS system file is assigned to Counselor FIG. 3. Counselor, receiving Student's telephone number in the file, calls him to identify what the issue is that is preventing him from attending Professor's class. Counselor has a conversation with Student, where Student tells Counselor that he was diagnosed with mono and is having a friend take notes for him while he recovers. Student explains that he was unaware that Professor had e-mailed him as he has not been on a computer during his recovery, and expects to resume attending the class next week. Counselor encourages Student to contact Professor by whatever means is convenient, and to contact any other instructors in which Student is not attending class. Counselor asks the student to notify her when he has contacted his instructors and resumes attendance.

Figure 7:
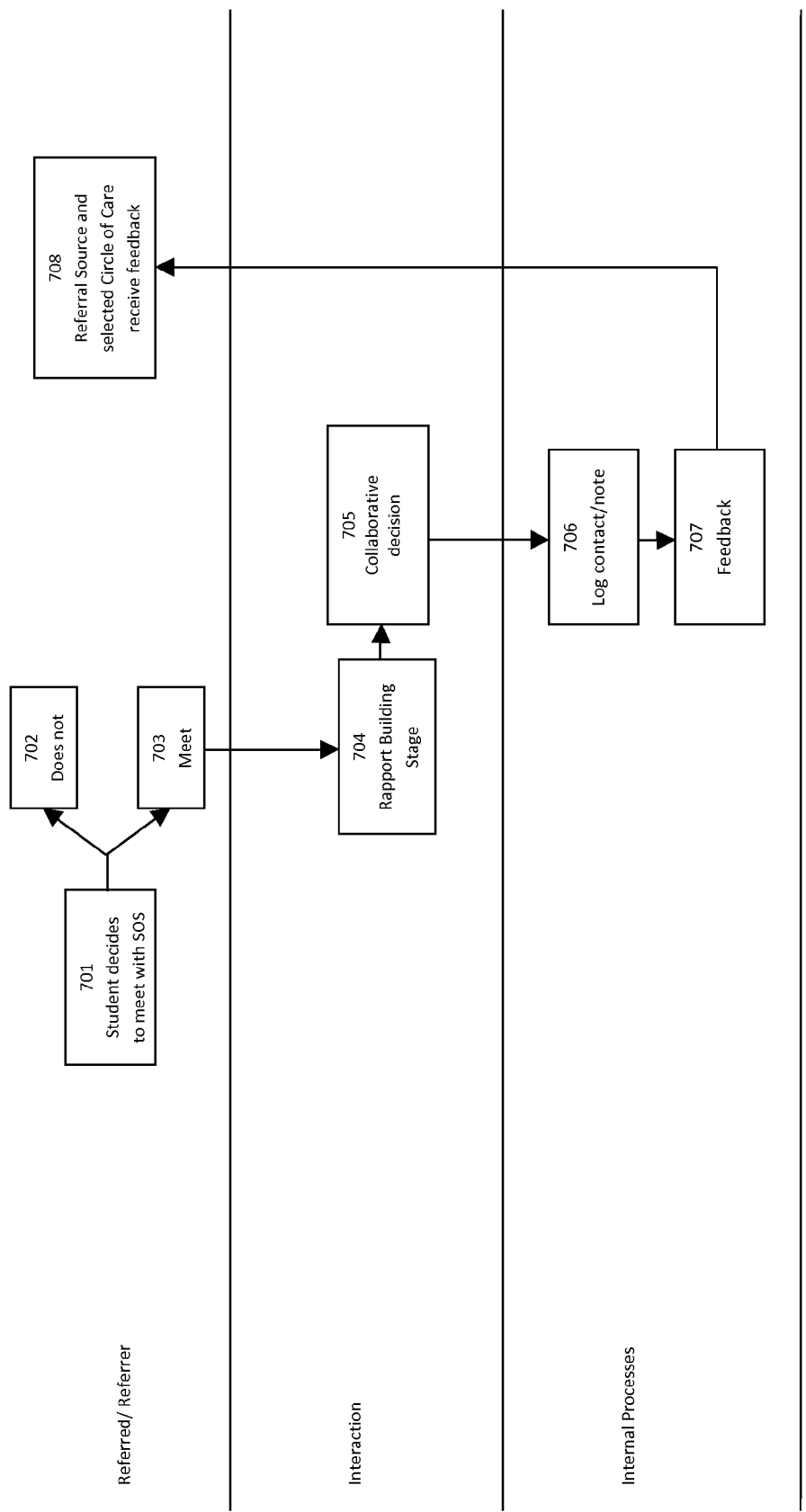
FIG. 7 illustrates a flow diagram of an exemplary face-to-face meeting between the counselor and the student according to an embodiment of the present invention.

Counselor then logs into the system and notes that she had a telephone conversation with Student, that his attendance will resume quickly and that he has not missed the information given in Professor's class, and that he will contact his instructors regarding his absence FIGS. 7 & 11. Counselor then e-mails Professor with similar information, omitting that Student had been diagnosed with mono, but stating that he is receiving class notes from a friend, will resume class attendance next week, and that Student will contact Professor regarding his absence FIGS. 7 & 11. When Student e-mails Counselor the next week that he has resumed attending class and has contacted all of his instructors regarding his absence, Counselor marks his file "resolved" FIG. 15. Counselor also informs the Professor and the Circle of Care that an update on the Student's progress is available in the form of a Progress Report. FIGS. 10 & 11.

Example 2

Parent has a conversation with Student, who is in her first semester at educational institution. Student states that she is "just unhappy" at educational institution and "doesn't see the need for a college education anymore." Concerned, Parent telephones the appropriate student counseling department at the educational institution. Parent states that he would like to refer Student to the SOS system FIG. 3. The person answering the telephone takes down the Student's name and other information including identification number and e-mail address, as well as Parent's information FIG. 3. The person who received the phone call opens up the referral form and types in the information provided by Parent FIGS. 2, 3, & 3a.

The coordinator receives the e-mail in the program inbox because the referral was input by staff at the educational institution. The coordinator reviews the referral, and accepts it FIG. 4. The coordinator then composes an e-mail to Parent stating that the referral has been received an accepted. Parent is now a member of Student's Circle of Care, but is not entered into the institution's system because they are not a member of the educational institution. Parent will receive notification of Student's progress outside of system software, and such notification will be noted in the system by Counselor.

Student, now accepted into the system, has a file automatically created using software designed for the system and in communication with software already employed by the educational institution that contains his information such as his course schedule, name, identification number, parent information, and telephone number FIG. 4. The file is assigned to Counselor FIG. 4. Counselor, receiving Student's telephone number in the SOS system file, e-mails her to set up an appointment to discuss the issues in the referral in a student interview FIG. 5. On receipt, Student returns Counselor's e-mail and sets up a time to meet for a student interview FIG. 6. At the interview Counselor ascertains that Student is having much conflict with her roommate and difficulty in her courses of study FIG. 7. Counselor notes this information in Student's file FIG. 7.

Counselor logs onto the system and asks that all of Student's instructors complete an audit FIG. 8. An audit request is sent to each instructor referring them to the audit page which asks how Student is performing in class, as well as attendance and behavior that may be pertinent FIG. 8. Each audit page also asks the instructor whether he or she would like to be notified of Student's progress through the system. Instructor, Student's professor in Math, receives the e-mail and indicates that Student's attendance is poor, and her performance is below average FIG. 9. Instructor also indicates that she would like to be notified of Student's progress FIG. 9. Student's other instructors follow the same process.

Counselor logs into the system again and receives the information provided by Student's instructors during the audit. Counselor also contacts Student's resident advisor to determine what the issue is with Student and her roommate. Counselor notes this conversation in Student's file FIG. 13. Counselor reviews all information gathered on Student and assesses the situation.

Counselor and Student meet again to discuss options for resolution of her issues FIG. 14. They both determine that Student is in need of career counseling and refers her to an appropriate individual trained in that area FIG. 14. They also determine that Student needs to discuss her roommate issues with her resident advisor FIG. 14.

Student is encouraged to contact Parent and tell him about the progress she has made in the system and the plan that she and Counselor have devised for resolution. Student asks Counselor to notify Parent, as Student is busily studying for her end of semester examinations. Counselor then checks Student's file to determine whether Student signed a FERPA[1], giving permission for Counselor to give information to Parent. Finding that Student has signed the document giving the institution the ability to talk to Parent, Counselor composes an e-mail to Parent, advising him of the actions taken on behalf of Student FIG. 13.

[1] The Family Educational Rights and Privacy Act ("FERPA") is a Federal law designed to protect the privacy of student education records. The law applies to current and former students of any institution which receives Federal funding, such as financial aid or grants.

Upon hearing that Student and resident advisor have devised a plan to cope with Student and her roommate's issues, and that Student has attended her first career counseling meeting, Counselor marks Student's file "resolved" FIG. 15. Counselor also sends notification of a Progress Report to Student's Circle of Care members as well as a separate e-mail to Parent, indicating that Student's issues have been addressed. FIGS. 11 and/or 13.

An early alert system and method for identifying and assisting students in need at an educational institution has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method for identifying and assessing a student in a community displaying an deviation in personality not associated with academic performance comprising:
   identifying the student by a member of the community or a person with a relationship to the student, those members of the community and persons with a relationship to the student comprising a Circle of Care;
   referring the student to a coordinator within the community by a member of the Circle of Care, communicating to the coordinator that the student is displaying an deviation in personality not associated with academic performance;
   inputting information regarding the student into a software system designed to accept information from the Circle of Care and said input being reviewed by the coordinator using a computer processor to create a student file, said software system and computer processor being required to centralize information about the student, coordinate communication among the Circle of Care, ensure resolution of a need, and store said information for potential future use;
   reviewing the referral by the coordinator to determine if the perceived deviation in personality not associated with academic performance of the student can be addressed by the community;
   assigning a counselor to the student by the coordinator using a computer processor, said computer processor providing an interface between the coordinator and counselor for immediate transmission and receipt of data regarding the student;
   assessing information relating to the student provided by the community and by the Circle of Care by the counselor, and accessible through said software system, said software system providing an interface between the Circle of Care, counselor, and coordinator and providing immediate transmission and receipt of data regarding the student, such that the reason for the deviation in personality of the student may be discovered, assessed, and resolved before academic performance is impacted;
   communicating with the student by the counselor to gather information about the student's deviation in personality not associated with academic performance;
   communicating with the Circle of Care regarding the student and noting the communication using the software system in the student's file;
   concluding the student's participation with the counselor when appropriate by the coordinator reviewing the student's progress, inputting information regarding the student within the software system, and closing the student's file within the software system, where the file is stored for potential subsequent use.

2. The method of claim 1, wherein the counselor uses a computer processor to transmits a request to members of the community who have a relationship to the student for information regarding the student.

3. The method of claim 1, wherein the counselor and the student determine that no assistance is necessary and the student file is closed.

4. The method of claim 1, wherein the member of the Circle of Care refers the student to the coordinator by using a computer processor and accessing a referral form that is available through a network interface through an educational institution community, the referral providing a list of needs or concerns the Circle of Care member may select, or may elect to describe a concern or potential need not referenced on the list by inputting text, and submit the referral form directly to the coordinator through the network interface, said coordinator being able to view the referral immediately.

5. The method of claim 1, wherein the deviation in personality not associated with academic performance is due to an issue regarding personality, behavior, financial stress, values, spiritual, mental, physical or social needs of the student.

6. A method for identifying and assessing a student in an educational institution displaying an deviation in personality not associated with academic performance comprising:
   identifying the student by a member of an educational institution or a person with a relationship to the student, those members of the educational institution and persons with a relationship to the student comprising a Circle of Care;
   referring the student to a coordinator by a member of the Circle of Care through the use of a software system interface to the coordinator, the coordinator being able to review the referral almost immediately, said referral conveying that the student is displaying an deviation in personality not associated with academic performance;
   reviewing the referral by the coordinator using said software system requiring a computer processor to determine if there is a need of the student can be addressed by the educational institution;
   creating a student file using a computer processor that contains information previously known by the educational institution regarding the student, and able to store and gather further information regarding the student as it is input by at least one member of the educational institution or the coordinator, said file being able to be accessed through the software system interface, in part, by the Circle of Care to input additional information and communicate with another member of the Circle of Care, the coordinator, or a counselor;

assigning the counselor to the student in need through the use of the software system;

assessing information relating to the student contained in the student file stored by the computer processor by the counselor;

communicating with the student by the counselor to gather information about the student's display of an deviation in personality not associated with academic performance and inputting that information into the student's file with the software system;

communicating with the Circle of Care by the counselor regarding the student in need and inputting the information into the student's file with the software system;

entering information using the software system regarding the student in need into the student file by the coordinator;

coordinating, by the counselor, communication between the student and a person who is capable of rendering assistance to the student where the counselor and the student have determined that assistance should be rendered, wherein records of said assistance are input using the software system into the student's file; and wherein after assistance is rendered to the student by said person who is capable of rendering assistance, the student file is not deleted from the software system and the student is no longer a participant in the method.

7. The method of claim 6, wherein the counselor transmits a request to members of the educational institution who have a relationship to the student for information regarding the student using the software system and computer processor.

8. The method of claim 6, wherein the counselor and the student determine that no assistance is necessary.

9. The method of claim 6, wherein after communication with the student or assistance has been rendered to the student, the counselor enters a notation in the system file using the software system stating that the student has been rendered assistance.

10. The method of claim 6, wherein the deviation in personality not associated with academic performance is due to an issue regarding personality, behavior, financial stress, values, spiritual, mental, physical or social needs of the student.

11. A method for identifying and assessing a student in an academic community displaying an deviation in personality not associated with academic performance comprising:

another student, a peer, a parent, or another person with a relationship to the student identifying the student displaying an deviation in personality not associated with academic performance;

said other student, peer, parent, or other person with a relationship to the student referring the student with a need to a coordinator;

the coordinator reviewing the referral and need of the student, wherein the student's deviation in personality not associated with academic performance is due to an issue regarding personality, behavior, financial stress, values, spiritual, mental, physical or social needs of the student;

the coordinator determining whether assistance should be rendered to the student, wherein if assistance will be rendered;

the coordinator, using a computer processor and software system, creating a file for the student;

the coordinator assigning a counselor to the student through the software system;

the counselor accessing the file of the student previously created by the community, wherein the file contains information previously known about the student, including present courses for which the student in need is registered and integrating the file into a new file regarding he identification and assessment of the student displaying an deviation in personality not associated with academic performance;

the counselor assessing the student and determining if assistance should be rendered, wherein if assistance should be rendered, the counselor contacting the student; and the counselor inputting information regarding determining if assistance should be rendered and communications with the student, and the counselor providing feedback to the person who referred the student in need to the coordinator wherein once need not concurrently associated with present academic performance is resolved, the student is no longer a participant in the method, and the student file is retained by the software system and computer processor for potential subsequent use.

12. The method of claim 11, wherein the student in need is referred to the coordinator by said another student, peer, parent, or another person with a relationship to the student in need by accessing a referral form that is available through a network interface using the software system through the academic community, the referral form providing a list of needs and concerns that said another student, peer, parent, or another person with a relationship to the student in need may select and submit the referral form directly to the coordinator through the network interface, or may input text to designate a need not listed in the referral form said referral form almost immediately available to the coordinator.

13. The method of claim 11, wherein after the counselor discusses the student's needs with the student, the counselor determines that assistance can be rendered by a person within the academic community, and the counselor communicates to the person to provide the student with assistance and notes this in the student's file using the software system.

14. The method of claim 11, wherein after the counselor discusses the student's deviation in personality with the student, the counselor determines that assistance can be rendered to the student by a person who is not a member of the academic community and the counselor communicates with the person to provide assistance to the student and inputs this data using the software system.

15. The method of claim 11, wherein the file that gathers and stores information relating to the student is created using the software system when the coordinator assigns the counselor to the student.

16. The method of claim 11, wherein after assistance has been rendered to the student, the counselor enters a notation in the file stating that the student has been rendered assistance using the software system.

17. The method of claim 11, wherein after communication with the student or assistance is rendered to the student, the counselor communicates that assistance has been rendered to the person who referred the student to the coordinator, and to other persons who have provided information regarding the student to the counselor using the software system to interface with those persons.

18. The method of claim 11, wherein the counselor communicates to members of the educational institution that are in contact with the student using the software system and the counselor requests those members to submit information regarding the student using the software system, said information being put in the file created for the student created by the coordinator with the software system.

* * * * *